(12) United States Patent
DuHack et al.

(10) Patent No.: US 7,163,590 B2
(45) Date of Patent: *Jan. 16, 2007

(54) METHOD AND APPARATUS FOR SENSING WATER FLOW THROUGH A DISHWASHER INCLUDING A VACUUM SWITCH

(75) Inventors: Michael R. DuHack, Indianapolis, IN (US); Laurence S. Slocum, Mooresville, IN (US); Andrew F. Schloot, Indianapolis, IN (US); Michael T. Clouser, Brownsburg, IN (US)

(73) Assignee: Emerson Electric Co., St. Louis, MO (US)

(*) Notice: Subject to any disclaimer, the term of this patent is extended or adjusted under 35 U.S.C. 154(b) by 175 days.

This patent is subject to a terminal disclaimer.

(21) Appl. No.: 10/462,883

(22) Filed: Jun. 17, 2003

(65) Prior Publication Data

US 2004/0255976 A1    Dec. 23, 2004

(51) Int. Cl.
*B08B 7/04*    (2006.01)
(52) U.S. Cl. .................... 134/18; 134/25.2; 134/56 D; 134/57 D; 134/113
(58) Field of Classification Search .............. 134/18, 134/25.2, 56 D, 57 D, 58 D, 113, 67 D
See application file for complete search history.

(56) References Cited

U.S. PATENT DOCUMENTS

| | | | |
|---|---|---|---|
| 3,831,617 A * | 8/1974 | Livingston | 137/98 |
| 3,835,880 A | 9/1974 | Hoffman et al. | |
| 4,180,088 A | 12/1979 | Mallett | |
| 4,249,565 A | 2/1981 | Brust | |
| 4,334,143 A | 6/1982 | Cushing | |
| 4,362,033 A * | 12/1982 | Young | 68/207 |
| 4,509,543 A * | 4/1985 | Livingston et al. | 134/57 D |
| 4,526,041 A | 7/1985 | Beller et al. | |
| 4,528,709 A * | 7/1985 | Getz et al. | 8/158 |
| 4,577,657 A | 3/1986 | Alexander | |
| 4,589,435 A | 5/1986 | Aldrich | |
| 4,932,227 A * | 6/1990 | Hogrefe | 68/17 R |
| 5,385,168 A | 1/1995 | Lund | |
| 5,578,763 A | 11/1996 | Spencer et al. | |
| 5,637,789 A | 6/1997 | Lawson | |
| 5,873,518 A | 2/1999 | Richmond et al. | |
| 5,918,268 A | 6/1999 | Lukas et al. | |
| 5,970,797 A * | 10/1999 | Hunter | 73/756 |
| 6,125,870 A | 10/2000 | Furmanek | |
| 6,164,319 A | 12/2000 | Cochran et al. | |
| 6,216,727 B1 | 4/2001 | Genova et al. | |
| 6,246,333 B1 | 6/2001 | Doner et al. | |
| 6,314,991 B1 | 11/2001 | Gill | |
| 6,333,689 B1 | 12/2001 | Young | |
| 6,752,875 B1 * | 6/2004 | Kiesler et al. | 134/18 |
| 2004/0255977 A1 * | 12/2004 | Slocum et al. | 134/57 D |
| 2004/0255988 A1 * | 12/2004 | DuHack et al. | 134/57 D |

* cited by examiner

*Primary Examiner*—Michael Barr
*Assistant Examiner*—Saeed Chaudhry
(74) *Attorney, Agent, or Firm*—Maginot Moore and Beck

(57) ABSTRACT

A dishwasher includes a water inlet connectable to a water source. A dishwasher element is operable on water received through the inlet. A flow sensor is in fluid communication with the inlet and is operable to generate a control signal indicative of water flow through the inlet. A control apparatus is connected between the dishwasher element and the flow sensor and is operable to inhibit operation of the dishwasher element in response to the control signal.

18 Claims, 16 Drawing Sheets

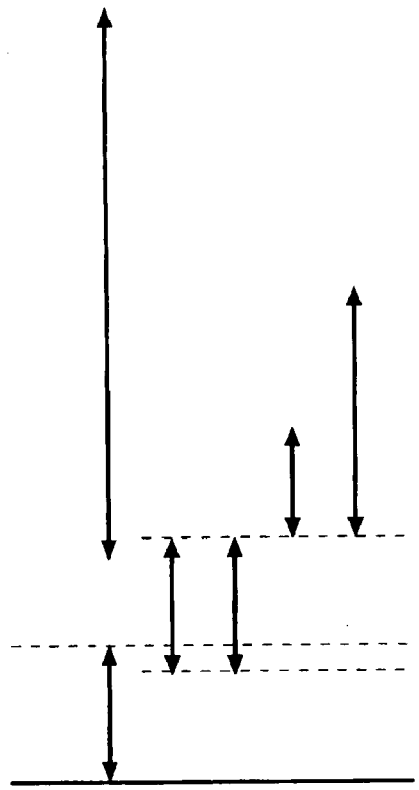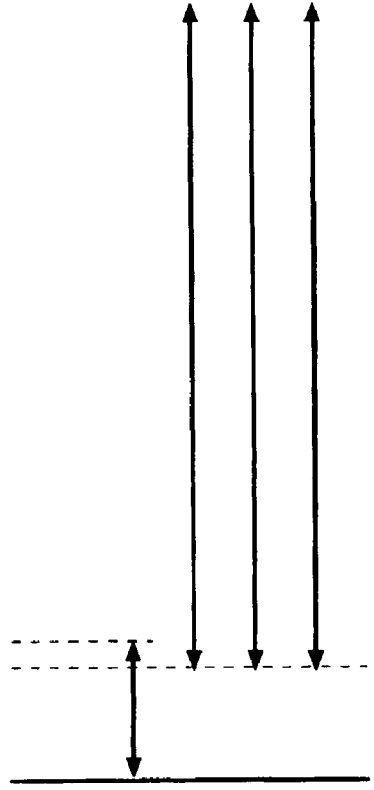

METHOD AND APPARATUS FOR SENSING WATER FLOW THROUGH A DISHWASHER INCLUDING A VACUUM SWITCH

BACKGROUND OF THE INVENTION

1. Field of the Invention

The present invention generally relates to dishwashers, and more particularly, to controlling the operation of a water pump or a water heater of a dishwasher.

2. Background of the Invention

Water pumps and water heaters are commonly used in dishwashers in order to increase the pressure and temperature, respectively, of the water used in the dishwasher. The water pump increases the water pressure before the water is sprayed on the dishes, thereby improving the cleaning effectiveness of the water. The water heater raises the temperature of the water before the water is sprayed on the dishes, which also improves the cleaning effectiveness of the water and dissolved detergent.

Both water pumps and water heaters in dishwashers rely on the presence of water in order to operate properly. In the absence of water, water pumps and water heaters can overheat, resulting in damage or destruction to the water pumps and water heaters and/or other components of the dishwasher. Moreover, a "dry" water heater poses a fire hazard. During normal operation of the dishwasher this is not a problem because the dishwasher supplies the water heater and water pump with water on which to operate. The dishwasher automatically opens at least one valve, thereby allowing water to enter the dishwasher, before the dishwasher applies power to either the water pump or the water heater. Thus, water is normally present when the water pump and the water heater are operated.

A problem does arise, however, if water does not enter the dishwasher as intended when the valve is opened. Water may not be available, for instance, if there is a leak in the valve, a leak in the pipes leading to the valve, or a failure of the water supply such as if the main water valve leading to the dishwasher valve is closed. In this event, the dishwasher may apply power to the water pump and/or the water heater on the assumption that water is present in the dishwasher. Because no water is, in fact, present, the water heater and/or the water pump may overheat and cause damage to themselves and/or to other parts of the dishwasher.

Accordingly, there is a need for a dishwasher that, among other things, (1) prevents the water pump and water heater from operating if water is not available; and (2) notifies the user of the unavailability of the water. The present invention addresses these and other needs.

SUMMARY OF THE INVENTION

In accordance with one aspect of the present invention, there is provided an improved dishwasher that senses a flow of water into the dishwasher and inhibits operation of the water pump and the water heater if the flow of water is not present. The dishwasher also indicates to a user that a flow of water is not present so that any plumbing problems can be corrected.

The present invention comprises, in one embodiment thereof, a dishwasher including a water inlet connectable to a water source. A dishwasher element is operable on water received through the inlet. A flow sensor is in fluid communication with the inlet and is operable to generate a control signal indicative of water flow through the inlet. A control apparatus is connected between the dishwasher element and the flow sensor and is operable to inhibit operation of the dishwasher element in response to the control signal.

The present invention comprises, in another embodiment thereof, a method of operating a dishwasher, including sensing a flow of water through the dishwasher, and inhibiting an operation of the dishwasher dependent upon the sensing step.

The present invention comprises, in yet another embodiment thereof, a dishwasher including a water inlet connectable to a water source. A dishwasher element is operable on water received through the inlet. A flow sensor assembly is in fluid communication with the inlet and is operable to generate a control signal indicative of water flow through the inlet. The flow sensor assembly includes a flow element configured to be pushed in a flow direction by the water flow. A biasing device biases the flow element in a second direction substantially opposite to the flow direction. A sensing device senses movement of the flow element in the flow direction in opposition to the biasing device. A control apparatus is connected between the dishwasher element and the flow sensor assembly and is operable to inhibit operation of the dishwasher element in response to the control signal.

The present invention comprises, in a further embodiment thereof, a dishwasher including a water inlet connectable to a water source. A dishwasher element is operable on water received through the inlet. A flow element is disposed within the inlet for movement in response to a flow of the water through the inlet. A sensing device generates a control signal as a result of the movement of the flow element. A control apparatus is connected between the dishwasher element and the sensing device and is operable to inhibit operation of the dishwasher element in response to the control signal.

The present invention comprises, in another embodiment thereof, a method of operating a dishwasher, including providing a conduit for carrying a fluid to the dishwasher. A temperature-sensing device is placed within the conduit. It is determined whether there is a flow of fluid in the conduit by using the temperature-sensing device. Operation of at least a portion of the dishwasher is inhibited dependent upon the determining step.

The present invention comprises, in a further embodiment thereof, a dishwasher including a conduit for carrying a fluid therein. A temperature-sensing device is disposed within the conduit. An electrical controller is coupled to the temperature-sensing device and determines whether there is a flow of fluid in the conduit based on at least one temperature sensed by the temperature-sensing device. The electrical controller also inhibits operation of at least a portion of the dishwasher dependent upon the at least one temperature sensed by the temperature-sensing device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 7a is a time chart of the method of FIG. 6 in the case where water is available in the valve;

FIG. 7b is a time chart of the method of FIG. 6 in the case where water is not available in the valve;

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
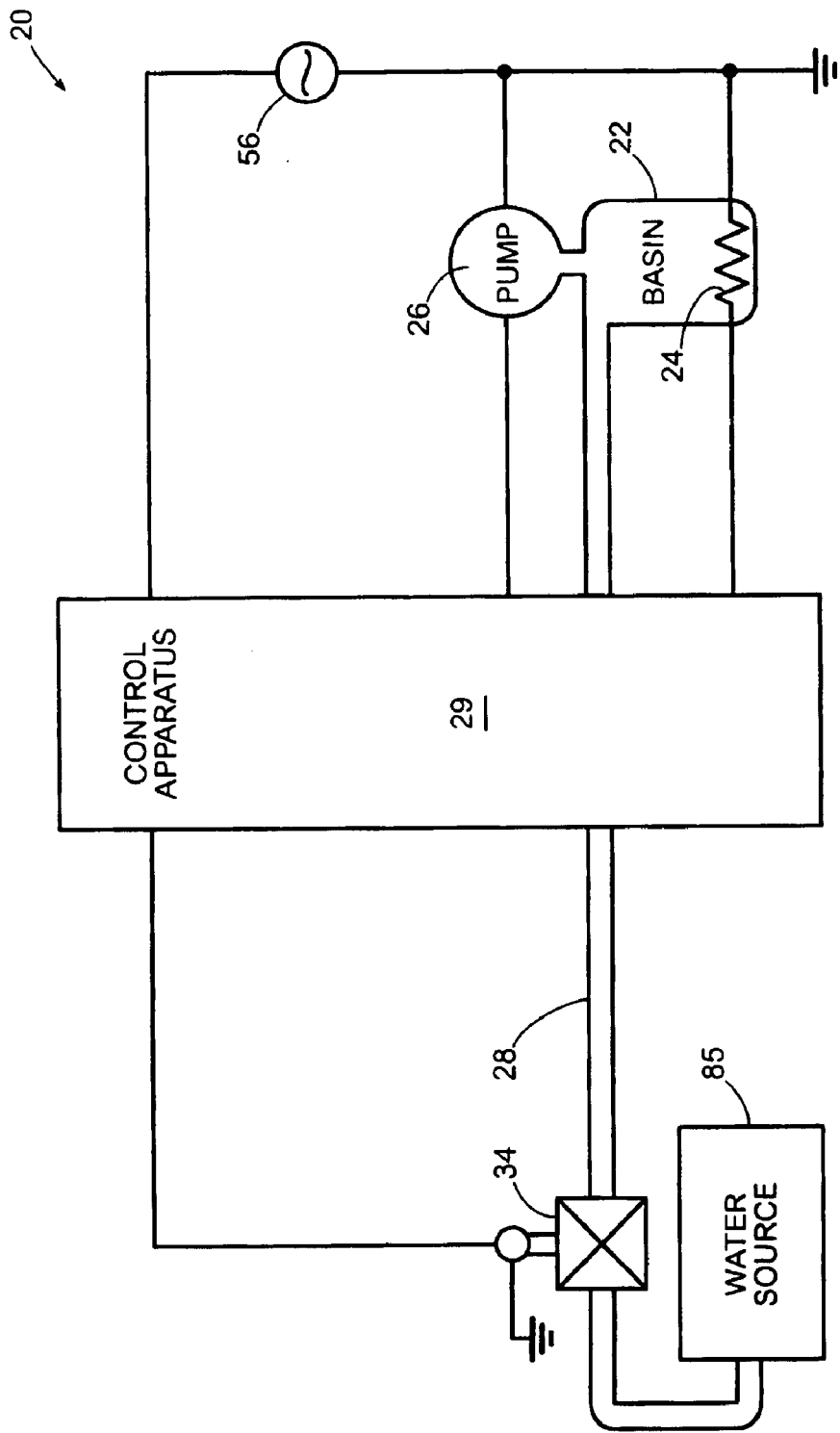
FIG. 1 is a schematic view of one embodiment of a dishwasher of the present invention.

Referring now to the drawings, and more particularly to FIG. 1, an exemplary cleaning appliance 20 constructed according to principles of the present invention is shown. For purposes of example and explanation, the cleaning appliance 20 of FIG. 1 is shown as a dishwasher. However, the principles of the present invention may also be applied to other types of washing appliances, such as a clothes washer. In FIG. 1, the exemplary dishwasher 20 includes a water basin 22, also known as a sump or reservoir, a water heater 24 disposed within the basin 22, a water pump 26, a conduit in the form of an inlet tube 28, a control apparatus 29 and an electrically actuated valve 34.

The control apparatus 29, powered by a voltage source 56, controls the overall operation of the dishwasher 20, including opening the valve 34 and optionally applying power to the heater 24 and the pump 26. More particularly, when a user initiates a dishwashing cycle, such as by pushing a button or turning a knob or dial, the control apparatus 29 opens the valve 34 to allow water from a water source 85 to pass through the inlet tube 28 and flow into the basin 22. The controller 29 optionally applies voltage to the heater 24 in order to heat the water in the basin 22. The controller 29 also applies voltage to the pump 26 in order to pump the water out of the basin 22 so that the water can be sprayed onto the dishes in the dishwashing chamber (not shown). The controller can also administer other functions of the dishwasher and timing of the dishwasher operations in a known manner.

As discussed above, damage can be caused by applying power to the heater 24 and/or pump 26 in the absence of water. In order to prevent such damage, the control apparatus 29 in accordance with the present invention verifies that water is flowing through the inlet tube 28 before the control apparatus 29 applies power to either the heater 24 or the pump 26. Specifically, the control apparatus opens the valve 34 to allow water into the inlet tube 28. If the controller 29 senses that water is not flowing through the tube 28 after the valve 34 is opened, then the controller 29 prevents the application of power to the heater 24 and the pump 26.

Figure 2:
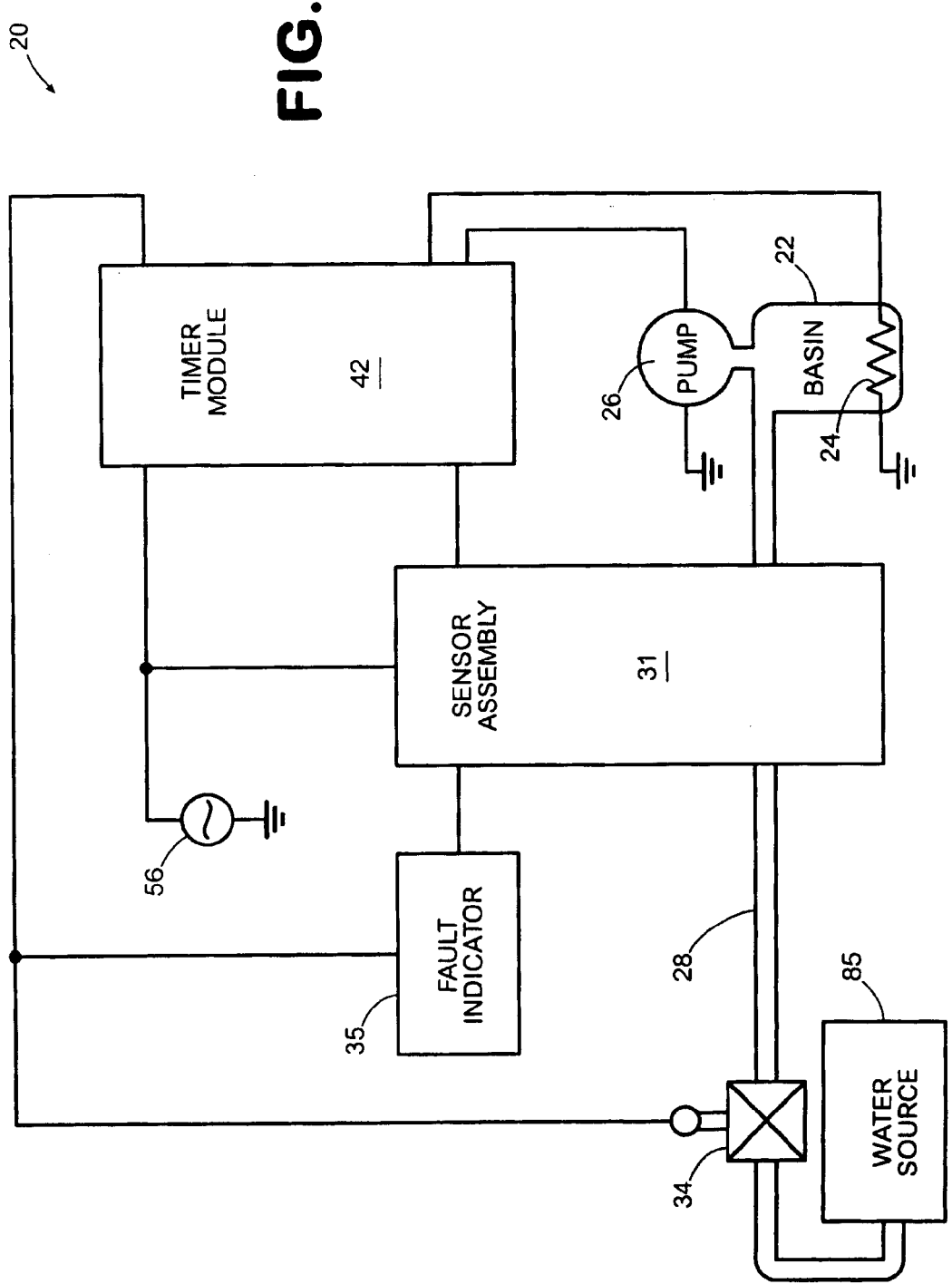
FIG. 2 is a more detailed schematic view of the dishwasher of FIG. 1.

In one feature of the invention, the control apparatus 29 includes a sensor assembly 31 a cycle controller in the form of timer module 42 and a fault indicator 35, as shown in FIG. 2. The timer module 42 controls the timing of the application of voltage to the valve 34, the heater 24 and the pump 26. The sensor assembly 31 senses whether water is flowing through the tube 28 after the timer module 42 has attempted to open the valve 34. If the sensor assembly 31 does sense a flow of water, then the timer module 42 proceeds with normal operation and applies voltage to the heater 24 and the pump 26. If the sensor assembly 31 does not sense a flow of water, then the sensor assembly 31 prevents the timer module 42 from applying voltage to the heater 24 and the pump 26. The sensor assembly 31 also activates the fault indicator 35 to indicate to the user that no water is flowing through the tube 28 and repairs may be needed. In certain embodiments of the invention, the controller can terminate all operations of the dishwasher, or can allow the dishwasher to continue through portions or all of its cycle of operation.

Several embodiments of the dishwasher of the present invention, including multiple embodiments of the sensor assembly 31, the timer module 42 and the fault indicator 35 will be described herein. It is to be understood that it may be possible in any particular embodiment of the dishwasher to swap the sensor assembly 31, the timer module 42 and/or the fault indicator 35 with another disclosed embodiment of the sensor assembly 31, the timer module 42 and/or the fault indicator 35 within the spirit and scope of the present invention.

Figure 3:
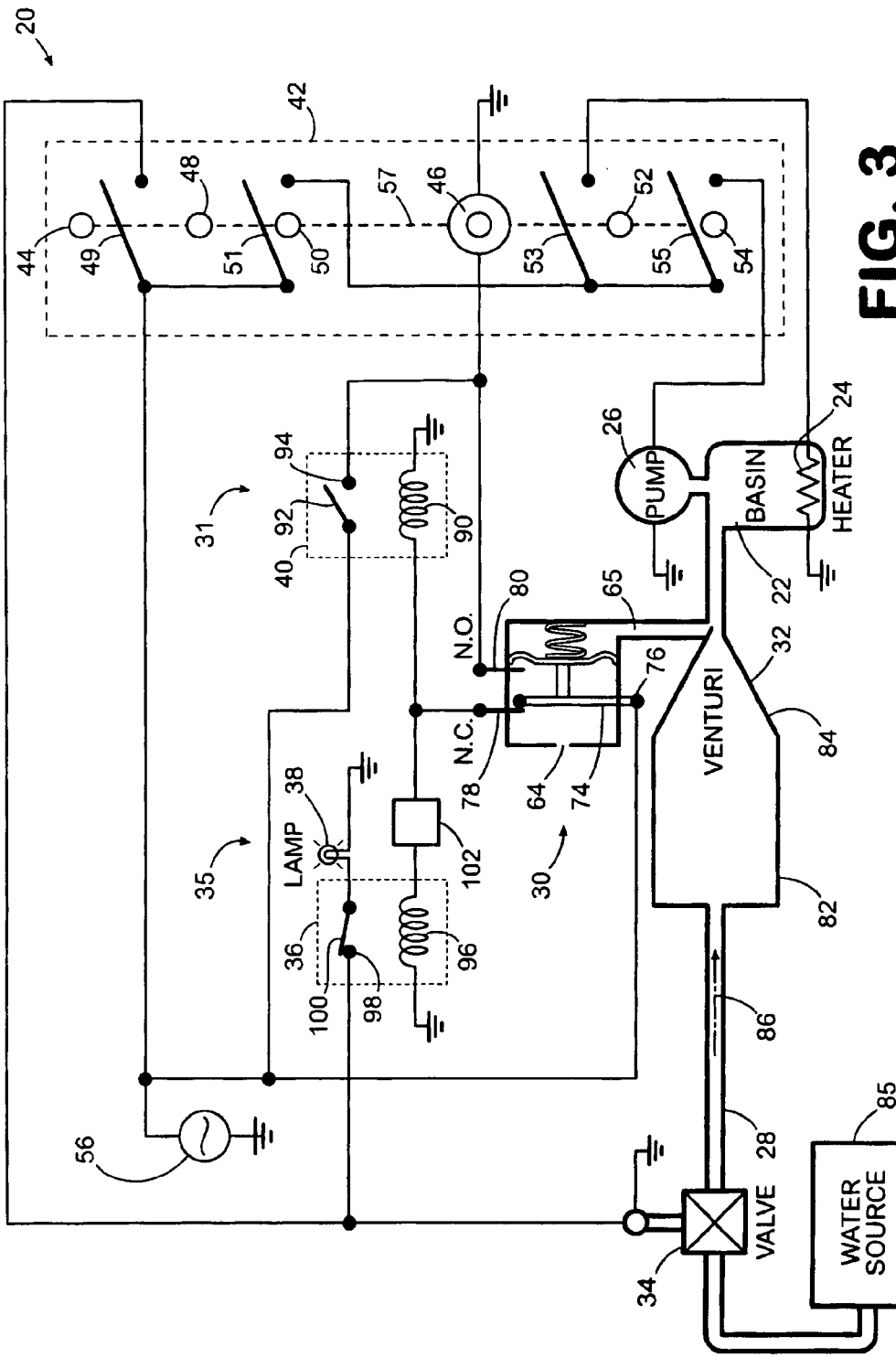
FIG. 3 is a still more detailed schematic view of the dishwasher of FIG. 1.

In one embodiment shown in FIG. 3, the sensor assembly 31 can include a vacuum switch 30, a venturi 32 and a relay 40. The fault indicator 35 can include a relay 36 and an indicator lamp 38. The timer module 42 can be of known construction, and can include a manually operable user control knob 44, a timer motor 46, a plurality of cams 48, 50, 52, 54, and respective associated cam-actuated switches 49, 51, 53, 55. The control knob 44 and cams 48, 50, 52, 54 are mounted to a cam shaft 57 driven by the timer motor 46. Each of the cam-actuated switches 49, 51, 53, 55 is mounted adjacent its associated cam in a manner well known in the appliance control art for sequential actuation of the various switches. The cam-actuated switch 49 connects the voltage source 56 to the valve 34; the cam-actuated switch 51 connects the voltage source 56 to the timer motor 46; the cam-actuated switch 53 connects the voltage source 56 to the water heater 24; and the cam-actuated switch 55 connects the voltage source 56 to the water pump 26.

Figure 4:
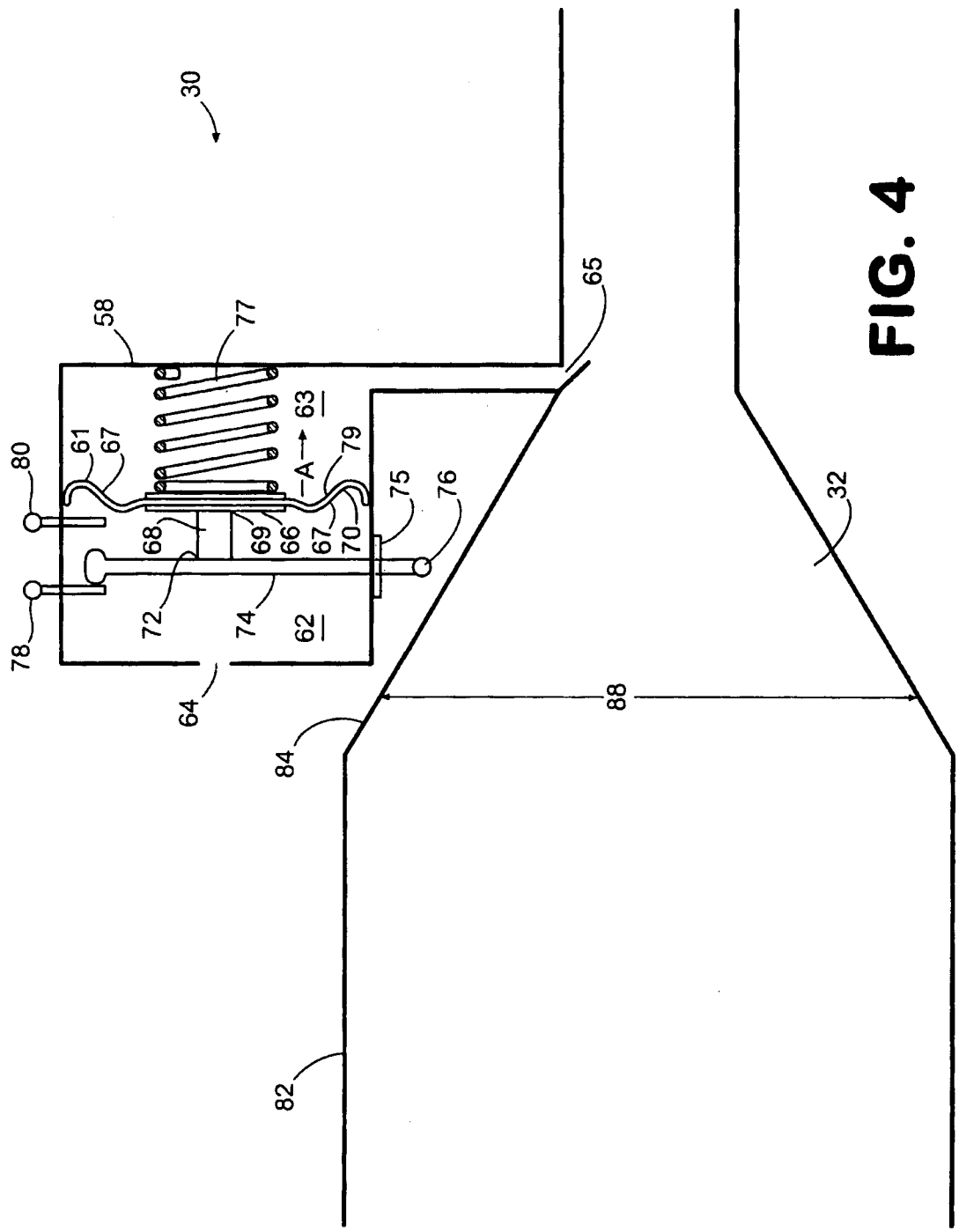
FIG. 4 is an enlarged schematic view of the venturi and vacuum switch of FIG. 2 with no water flowing through the venturi, and the vacuum switch being in its normal, unactuated position.

FIG. 4 shows the vacuum switch 30 in greater detail, although still schematically, in the condition in which no water is flowing past or through the venturi 32. The vacuum switch 30 includes a differential pressure housing 58. A diaphragm 61 is disposed within the housing 58 and separates the same into a first chamber 62 and a second chamber 63. The second chamber 63 and the venturi collectively define a substantially enclosed space.

The housing 58 includes a first port 64 and a second port 65. The first port 64 is a vent port and fluidly connects the first chamber 62 with the ambient air. The second port 65 is a venturi opening and fluidly connects the second chamber 63 with the venturi 32. The vent port 64 is open to atmosphere and the venturi's capillary port 65 is in the fluid (water) stream. The diaphragm 61 is sealingly engaged within the vacuum switch 30 and serves to isolate and separate the chambers 62, 63.

When water flows through the venturi 32, there is a differential pressure between the first and second chambers 62, 63, respectively. Specifically, the venturi 32 creates a low pressure vacuum at the second port 65 and in the second chamber 63. Since the pressure at the first port 64, i.e., atmospheric pressure, is higher than the pressure at the second port 65 when the water flows through the venturi 32, the pressure within the first chamber 62 is greater than the pressure in the second chamber 63.

Differential pressure between the first chamber 62 and the second chamber 63 moves at least a portion of the diaphragm 61. Movement of the diaphragm 61 in turn is used to "trip" the vacuum switch 30, as discussed in more detail below.

The diaphragm 61 includes a centrally disposed, planar first section 66. Surrounding or disposed about the first section 66 is a flexible second section 67 extending between the first section 66 to where the diaphragm 61 engages an interior surface of the housing 58. A connecting member 68 includes a first end 69 which engages a first side 70 of the diaphragm 61 such that the connecting member 68 is perpendicular to the first section 66 of the diaphragm 61. A second end 72 of the connecting member 68 is connected to an electrically conductive, flexible switch arm 74. One end of the flexible switch arm 74 is fixedly attached to the housing 58 at 75. As the diaphragm 61 deflects due to a pressure differential between the first chamber 62 and the second chamber 63, the switch arm 74 bends or flexes such that a distal end of the switch arm 74 moves from the contact 78 to the contact 80.

A biasing member 77 in the form of a helical coil spring is disposed in the second chamber 63. One end of the spring 77 engages an interior surface of the housing 58. The other end of the spring 77 interfaces with the second or low pressure side 79 of the diaphragm 61. The spring 77 opposes movement of the diaphragm 61 in the direction of the arrow A.

The switch arm 74 is flexible such that the distal end of the switch arm 74 is movable between a fixed, normally closed contact 78 and a fixed, normally open contact 80. In the absence of water flowing through the venturi 32, the spring 77 holds the switch arm 74 in the position shown in FIG. 4 such that the switch arm 74 electrically interconnects the normally closed contact 78 and the voltage source 56 through a contact 76.

Figure 5:
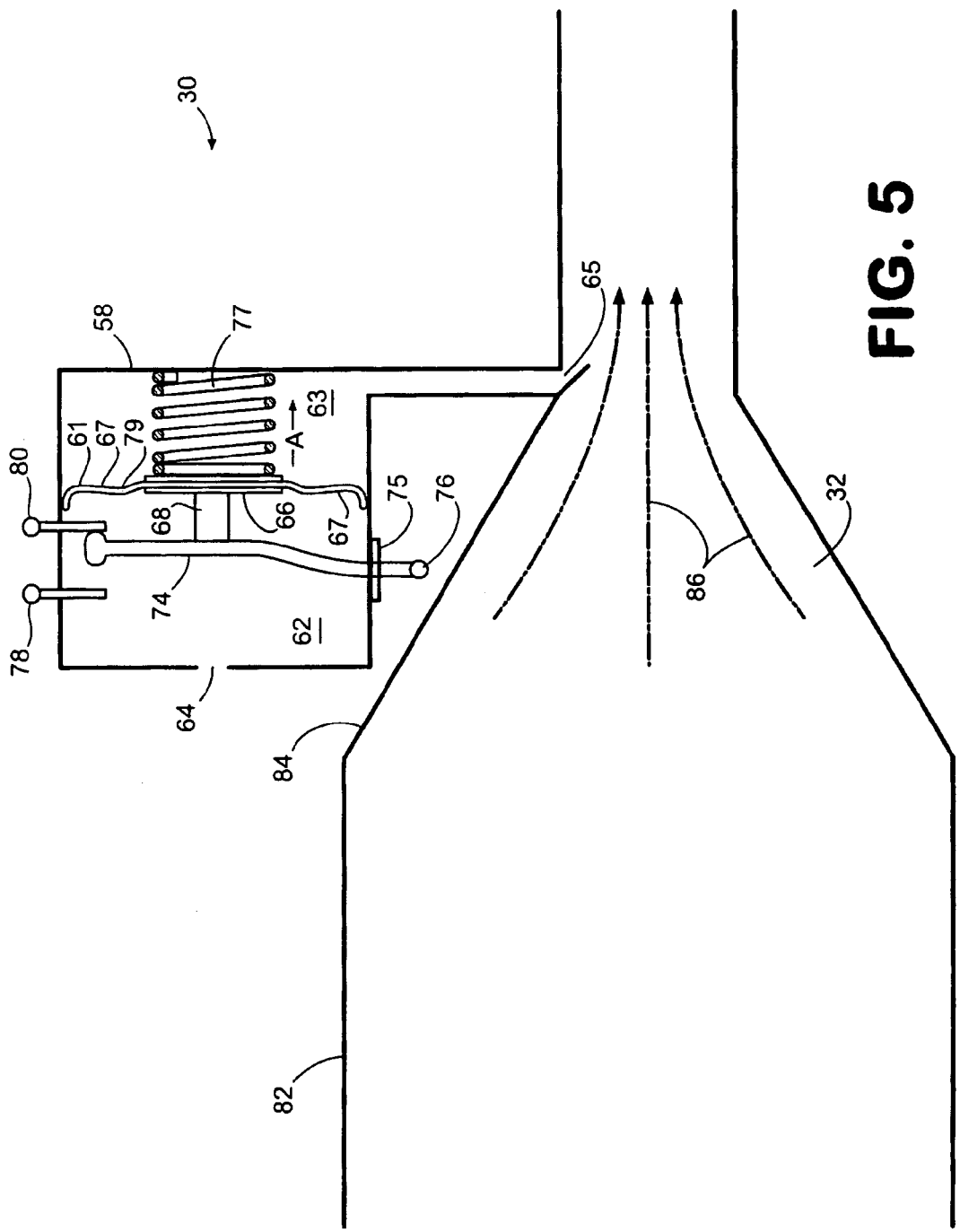
FIG. 5 is an enlarged schematic view of the venturi and vacuum switch of FIG. 3 with water flowing through the venturi, and the vacuum switch being in its actuated position.

The venturi 32 includes a conduit extending between an inlet end 82 and an outlet end 84. The outlet end 84 tapers in a direction of water flow 86 (FIG. 5). That is, a width 88 and a cross-sectional area of the outlet end 84 decreases in the direction of water flow 86.

Figure 6A:
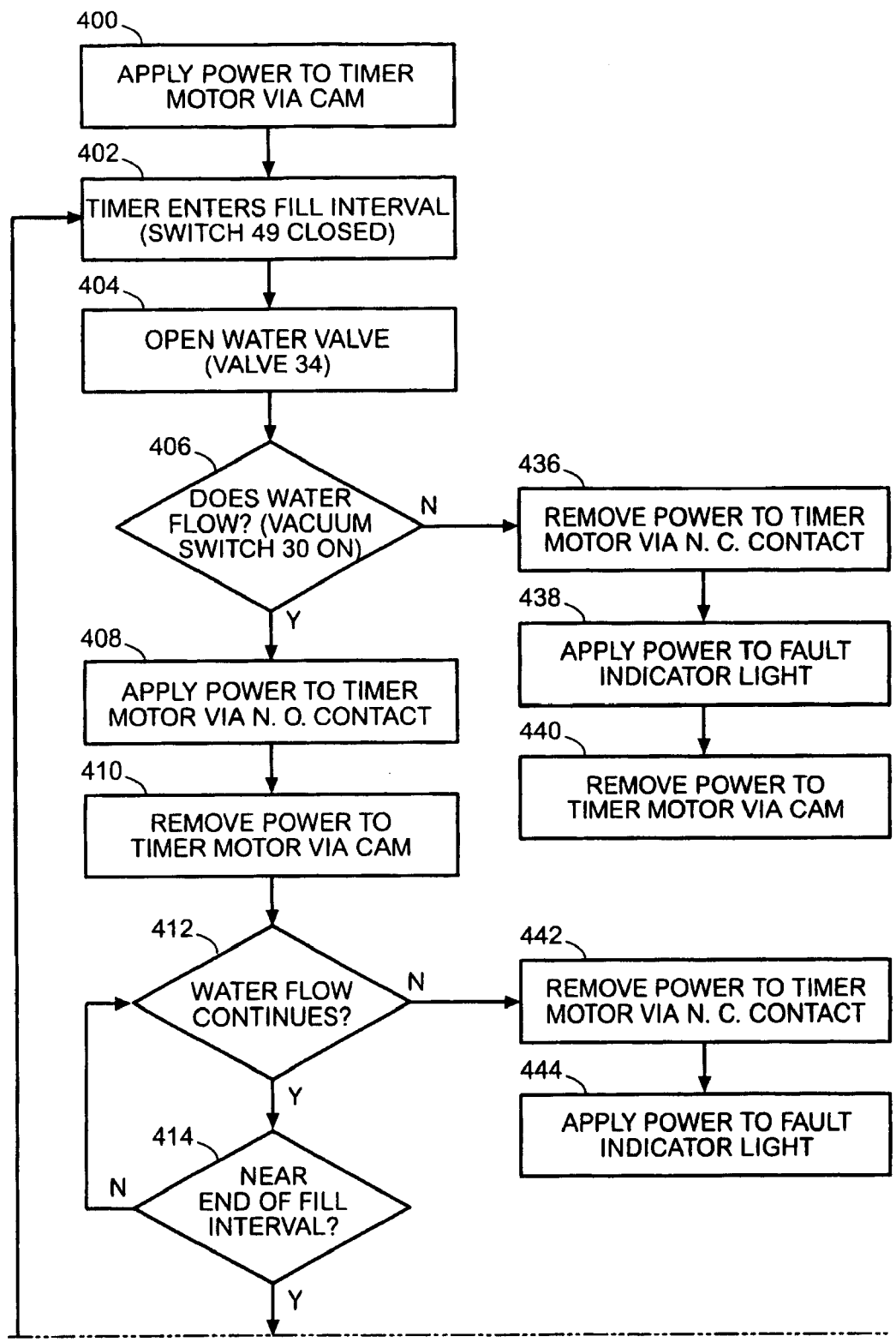
FIG. 6A and FIG. 6B are a flow chart of one embodiment of a method of the present invention utilizing the dishwasher of FIG. 3.
Figure 6B:
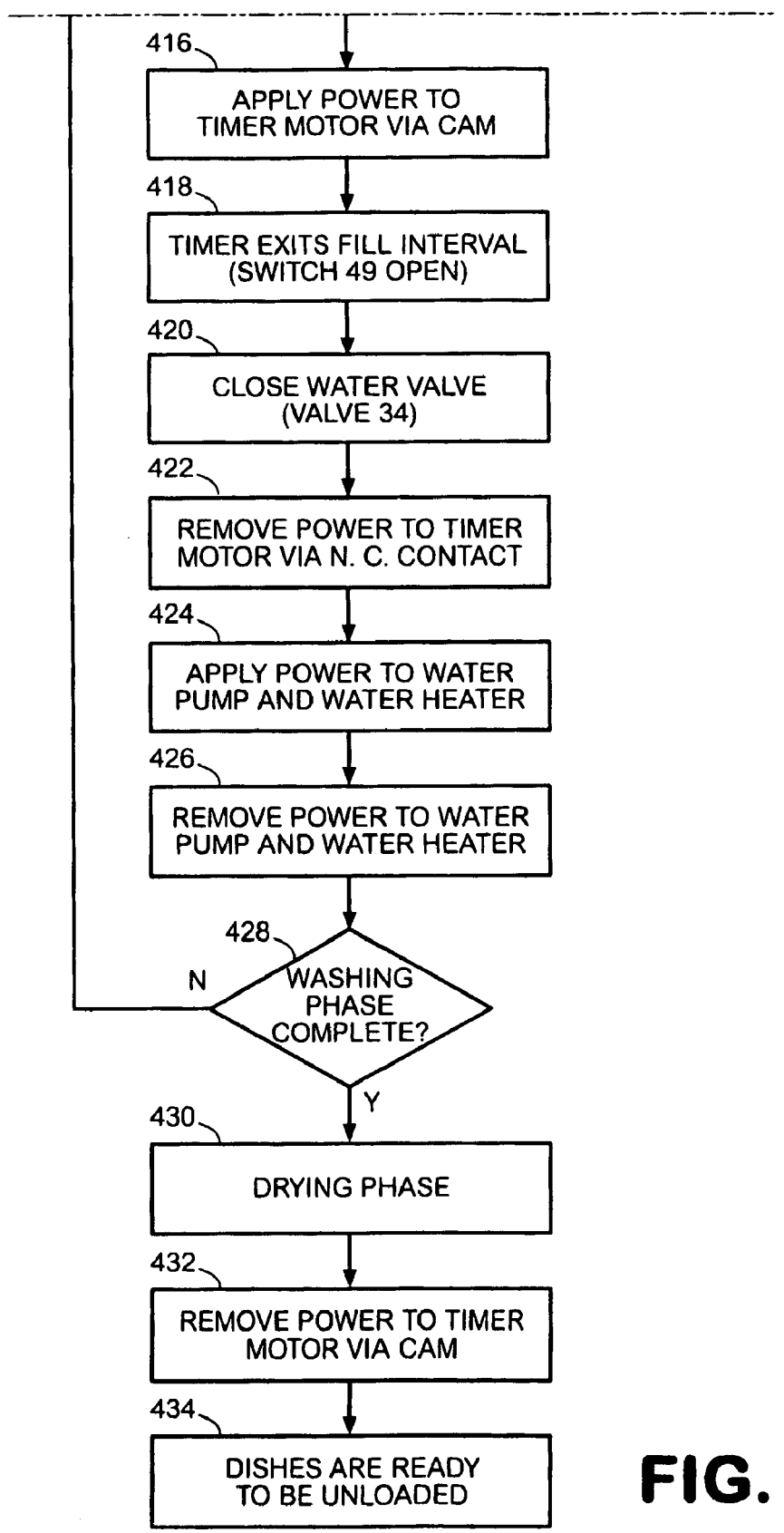

The operation of the dishwasher 20 will now be described with reference to the flow chart of FIG. 6. To initiate operation of the dishwasher 20, a user turns the control knob 44. The rotation of the control knob 44 causes the cam 50 to rotate and the switch 51 to close, which thereby connects the voltage source 56 to the timer motor 46 (step 400).

When the voltage is applied to the timer motor 46, the timer motor 46 starts to run, turning the cam shaft 57 and the cam 48 until the switch 49 closes, thereby connecting the voltage source 56 to the valve 34. When the switch 49 closes, the timer module 42 has entered the fill interval (step 402) in which the water basin 22 is to be filled with water.

As voltage is applied to the water valve 34, the valve 34 opens (step 404), allowing water from a water source 85, such as a well, municipal water supply, or water heater, to flow through the valve 34 and the inlet tube 28 in the direction indicated by arrow 86 (FIG. 5). The water then flows through the venturi 32 and into the water basin 22. As the water flows through the outlet end 84 of the venturi 32, the water increases speed and causes the pressure at the port 65 to be lower than the pressure at the port 64, as is well known in the fluid control art.

FIG. 5 shows the vacuum switch 30 in the condition in which water is flowing through the venturi 32, as indicated by arrows 86. The flow of the water creates a vacuum within the second chamber 63 that sucks the diaphragm 61 in the direction of arrow A, overcoming the retaining force of the spring 77, as shown in FIG. 5. As the diaphragm 61 moves in direction A, the attached connecting member 68 pulls the switch arm 74 while following the movement of the diaphragm 61. As the switch arm 74 flexes in direction A, the switch arm 74 breaks electrical connection with the normally closed contact 78 and comes into electrical contact with the normally open contact 80 at the end of the movement of the switch arm 74.

Via the sequence of events described above, the position of the vacuum switch 30 indicates whether water is flowing through the venturi 32 (step 406). More particularly, if the switch arm 74 is electrically connected to the normally closed contact 78, it indicates that no water is flowing through the venturi 32. In this case, power is removed from the timer motor 46, as described in more detail below. On the other hand, if the switch arm 74 is not electrically connected to the normally closed contact 78, but rather is electrically connected to the normally open contact 80, it indicates that water is flowing through the venturi 32. If the switch arm 74 is electrically connected to neither the normally closed contact 78 nor the normally open contact 80, it may indicate that there is some partial flow of water in the venturi 32, but not enough to fully actuate the vacuum switch 30 such that the switch arm 74 contacts the normally open contact 80. If this occurs, the dishwasher will operate in this embodiment as though the vacuum switch 30 were fully actuated. However, it is also possible to design the dishwasher so that a partial flow of water is treated the same as a total absence of water.

As described above, if water is available at the valve 34 when the valve is opened, and if the water is able to flow through the valve 34 and into the venturi 32, then the switch arm 74 becomes electrically connected to the normally open contact 80. Thereby, the voltage source 56 is electrically connected to the timer motor 46 through the switch arm 74 and the normally open contact 80 (step 408). This application of power to the timer motor 46 via a control signal generated by the vacuum switch 30 through the normally open contact 80 is redundant in the sense that power is also simultaneously applied to the timer motor 46 via the cam 50 and switch 51. The redundancy is short-lived, as the power through the switch 51 will soon disappear, as described below. However, the temporary overlap in power supply is necessary in order to ensure that a possible late actuation of the vacuum switch 30 does not cause the timer motor 46 to lose power completely.

The time chart of FIG. 7a indicates that the opening of the water valve 34 and the application of power to the timer motor 46 through the normally open contact 80 occur substantially simultaneously. However, it is to be understood that there is some small period of time required for the water to flow through the opened valve 34, flow through the inlet tube 28 and the venturi 32, and actuate the vacuum switch 30. Thus, there is, in actuality, some small period of time between the opening of the water valve 34 and the application of power to the timer motor 46 through the normally open contact 80. Because this small time period is negligible in comparison with the other time periods illustrated in FIG. 7*a*, and for ease of illustration, FIG. 7*a* has been simplified in this respect.

Before the water flows through the venturi 32, a coil 90 of the relay 40 is electrically connected to the voltage source 56 through the switch arm 74 and the normally closed contact 78. The relay 40 can be the type of relay wherein a magnetic field produced by the coil 90 causes the contacts 92, 94 of the relay 40 to open from a closed position and remain open so long as the magnetic field is present, as is well known in the art. As the water flows through the venturi 32, and the switch arm 74 moves out of electrical contact with the normally closed contact 78, current through the coil 90 ceases. In the absence of the electrical field produced by the current through the coil 90, the contacts 92, 94 close, thereby providing another current path between the voltage source 56 and the timer motor 46 while the water flows through the venturi 32.

As the timer motor 46 continues to run and rotate the cam shaft 57, the further rotation of the cam 50 causes the switch 51 to open, thereby breaking the electrical connection between the voltage source 56 and the timer motor 46 through the switch 51, and ceasing the application of power to the timer motor 46 via the cam 50 (step 410). Because the opening of the switch 51 occurs some time after the vacuum switch 30 is actuated, thereby providing power to the timer motor 46 through the normally open contact 80 and through the contacts 92, 94, power to the timer motor 46 is not interrupted. That is, as shown in FIG. 7*a*, there is some overlap in time between the application of power to the timer motor 46 via the cam 50 and the application of power to the timer motor 46 via the normally open contact 80. However, as described in more detail below, if there is no water flow through the venturi 32, then power will be supplied to the timer motor 46 through neither the normally open contact 80 nor the contacts 92, 94. In this, case, removing power through the cam 50 and switch 51 will have the effect of completely removing power from the timer motor 46, and thereby preventing the timer motor 46 from applying power to the heater 24 and the pump 26 in the absence of water.

The current path through the contacts 92, 94 is a lower resistance path between the voltage source 56 and the timer motor 46 than is the current path through the switch arm 74 and the normally open contact 80. Thus, the majority of the current from the voltage source 56 to the timer motor 46 is routed through the contacts 92, 94 while water flows past the venturi 32.

The timer motor 46 continues to run and rotate the cam shaft 57 as water flows through the venturi 32. The vacuum switch 30 monitors the water flow through the venturi 32 and confirms that the water flow continues (step 412) as long as the valve 34 is open. So long as the water flow continues, the dishwashing cycle continues and no action is necessary. The vacuum switch 30 continues to monitor the water flow through the venturi 32. If, on the other hand, the vacuum switch 30 determines that the water flow through the venturi 32 has ceased, then power is removed from the timer motor 46, as discussed in more detail below.

Shortly before the end of the fill interval (step 414), the rotation of the cam 50 causes the switch 51 to close, thereby reestablishing both the electrical connection between the voltage source 56 and the timer motor 46 through the switch 51 and the application of power to the timer motor 46 via the cam 50 (step 416). Thus, power is again applied redundantly to the timer motor 46 in the sense that power is simultaneously applied via the normally open contact 80.

As the uninterrupted operation of the timer motor 46 continues, the rotation of the cam 48 causes the opening of the switch 49 (step 418), which, in turn, removes the application of power to the valve 34. As voltage is removed from the water valve 34, the valve 34 closes (step 420), stopping the water flow through the valve 34 and the inlet tube 28. As the water stops flowing through the venturi 32, the low pressure within the second chamber 63 ceases, allowing the spring 77 to push the diaphragm 61 back to the position shown in FIG. 4. The diaphragm 61 moves in a direction opposite to the direction of arrow A, thereby causing the switch arm 74 to break electrical connection with the normally open contact 80 and come into electrical contact with the normally closed contact 78 at the end of the motion.

The time chart of FIG. 7*a* indicates that the closing of the water valve 34 and the removal of power to the timer motor 46 through the normally open contact 80 occur substantially simultaneously. However, it is to be understood that there is some small period of time required for the water to stop flowing through the valve 34, the inlet tube 28 and past the venturi 32, and for the switch arm 74 to break contact with the normally open contact 80. Thus, there is, in actuality, some small period of time between the closing of the water valve 34 and the removal of power to the timer motor 46 through the normally open contact 80. Because this small time period is negligible in comparison with the other time periods illustrated in FIG. 7*a*, and for ease of illustration, FIG. 7*a* has been simplified in this respect.

As the vacuum switch 30 returns to the position of FIG. 4, the switch arm 74 again electrically connects the voltage source 56 to the relay 40 via the normally closed contact 78. The coil 90 of the relay 40 is energized by the control signal voltage generated by the vacuum switch 30 and applied across the coil 90. The excitation of the coil 90 produces a magnetic field which caused the contacts 92, 94 to open. Thus, with power no longer being supplied to the timer motor 46 via the normally open contact 80, power to the timer motor 46 is also removed via the normally closed contact 78 (step 422). Although power to the timer motor 46 via the contacts 78, 80 is thereby removed, power is still applied to the timer motor 46 via the switch 51.

Some time after the end of the fill interval, i.e., after water has stopped flowing past the venturi 32, the operation of the timer motor 46 causes power to be applied to the heater 24 and to the pump 26 (step 424). More particularly, the operation of the timer motor 46 and the rotation of the cam 52 causes the switch 53 to close, thereby electrically connecting the voltage source 56 and the heater 24. The power applied to the heater 24 results in the heating of the water in the basin 22. Also, the operation of the timer motor 46 and the rotation of the cam 54 causes the switch 55 to close, thereby electrically connecting the voltage source 56 and the water pump 26. The water pump 26 sprays the heated water from the basin 22 onto the dishes in the washing chamber (not shown).

Power is applied to the heater 24 and to the pump 26 for some respective, predetermined time periods before the operation of the timer motor 46 causes power to be removed from the heater 24 and from the pump 26 (step 426). More particularly, the rotation of the cam 52 causes the switch 53 to open and disconnect the voltage source 56 from the heater 24. In the embodiment shown in FIG. 7a, the pump 26 continues to run after power to the heater 24 has been discontinued, thereby spraying the dishes with water that has been heated previously by the heater 24. However, the further rotation of the cam 54 causes the opening of the switch 55, which, in turn, removes the application of power to the water pump 26. The water pump 26 stops spraying water as voltage is removed by the switch 55. This completes the washing cycle.

If one or more additional washing cycles are required, then the washing phase is not complete (step 428) and the timer motor 46 enters a fill interval again (step 402). Specifically the cam 48 again causes the switch 49 to close, thereby beginning another washing cycle. On the other hand, if an additional washing cycle is not required, then the washing phase is complete (step 428) and the machine may enter a drying phase (step 430) during which the dishes are dried. After the drying phase, the continued operation of the timer motor 46 and rotation of the cam 50 causes the switch 51 to open, thereby removing the power to the timer motor 46 (step 432). At this point, the dishes are ready to be unloaded (step 434).

In the embodiment depicted in FIG. 7a, the closing of the water valve 34 and the removal of power to the timer motor 46 through the normally open contact 80 occur substantially simultaneously with the application of power to the heater 24 and to the pump 26. However, it is to be understood that it is also possible for the first application of power to the heater and pump to occur at either some point in time before or some point in time after the end of the water fill interval.

If water is not available at the outlet of the valve 34 when the valve 34 is first opened (step 404), perhaps because of a leak in the plumbing leading to the valve 34 or a defect in the valve 34 itself, water does not flow through the venturi 32 and the vacuum switch 30 is not actuated. That is, the vacuum switch 30 remains in the position of FIG. 4. Thus, the position of the vacuum switch 30 indicates that water is not flowing through the venturi 32 (step 406).

As the vacuum switch 30 remains in the position of FIG. 4, the switch arm 74 electrically connects the voltage source 56 to the relay 40 via the normally closed contact 78. A coil 90 of the relay 40 is energized by the control signal voltage generated by the vacuum switch 30 and applied across the coil 90. By the contacts 92, 94 remaining open, the voltage source 56 is completely disconnected from the timer motor 46. Thus, the power to the timer motor 46 is removed via the normally closed contact 78 (step 436).

As the vacuum switch 30 remains in the position of FIG. 4, the switch arm 74 also electrically connects the voltage source 56 to the relay 36 via the normally closed contact 78. A coil 96 of the relay 36 is energized by the voltage applied across the coil 96. The relay 36 can be a different type of relay than relay 40. That is, the relay 36 can be of the type wherein a magnetic field produced by the coil 96 causes the contacts 98, 100 of the relay to close from an open position and remain closed so long as the magnetic field is present, as is also well known in the art. When the contacts 98, 100 are closed, the voltage applied to the valve 34 by the timer module 42 is also applied to the fault indicator lamp 38. Thus, power is applied to the fault indicator light 38 (step 438) when voltage is applied to both the valve 34 and to the normally closed contact 78. That is, power is applied to the fault indicator light 38 when the valve 34 is opened to make possible a flow of water into the venturi 32, but water does not actually flow through the venturi 32, as sensed by the vacuum switch 30.

A delay circuit 102 may be included between the normally closed contact 78 and the relay 36 in order to provide a small time delay in the transmission of the voltage signal from the normally closed contact 78 to the relay 36. The time delay prevents the fault indicator light 38 from flashing on during the brief reaction time period of the vacuum switch 30 between the valve 34 being opened and power being removed from the normally closed contact 78.

Alternatively, it is possible to not include the delay circuit 102 and allow the fault indicator light 38 to flash on between the application of power to the valve 34 and the removal of power to the normally closed contact 78. The flashing of the light 38 may serve as a indicator to the user that the light 38 is operational.

The sustained illumination of the fault light 38 indicates to a user that the water supply to the dishwasher has been interrupted, which may mean a leak needs to be repaired in the inlet tube 28, the valve 34 or the venturi 32. As in the case where water does flow through the venturi 32, the power to the timer motor 46 via the cam 50 is removed (step 440).

If the vacuum switch 30 senses that an existing flow of water has stopped (step 412), then power is removed from the timer motor 46 (step 442). More particularly, when the water flow through the venturi 32 stops, the switch arm 74 moves into electrical contact with the normally closed contact 78, just as in the case when the valve 34 is closed (step 420), as discussed above. The subsequent opening of the contacts 92, 94 of the relay 40 removes all voltage from the timer motor 46, as the switch 51 is open at this point in time. When the switch arm 74 is electrically connected to the normally closed contact 78, the contacts 96, 100 of the relay 36 close as a result of the excitation of the coil 96, and the fault indicator lamp 38 becomes lit (step 444).

As described above, the dishwasher 20 does not allow power to be applied to the dishwasher elements, i.e., the heater 24 and the pump 26, when water is not flowing through the venturi 32. Specifically, in the absence of water flow through the venturi 32 when valve 34 is open, the contacts 92, 94 open to thereby remove power from the timer motor 46, the heater 24 and the pump 26. Thus, the dishwasher 20 prevents the dishwasher elements from operating without the cooling effect of water and thereby overheating.

Figure 8:
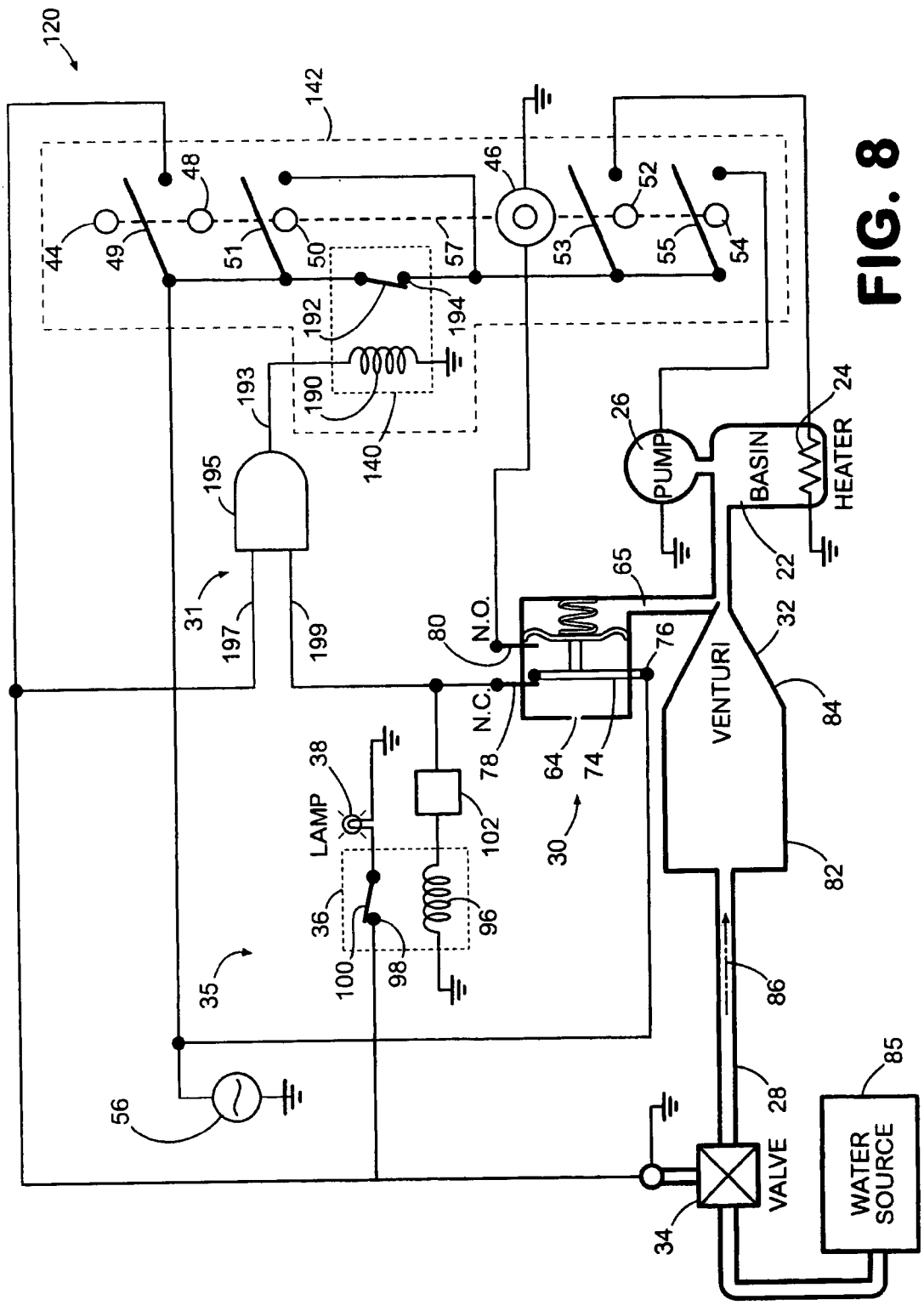
FIG. 8 is a schematic view of another embodiment of a dishwasher of the present invention.

In another embodiment of the invention, a dishwasher 120, shown in FIG. 8, includes a timer module 142 having a relay 140 with a coil 190 and contacts 192 and 194. The contacts 192, 194 selectively connect the switches 53, 55 to the voltage source 56. The switches 53, 55, as in the previous embodiment, selectively apply the voltage from the voltage source 56 to the water heater 24 and the water pump 26, respectively. The coil 190 is electrically connected to the output 193 of an AND gate 195. The two inputs 197, 199 to the AND gate 195 are connected to the input of the valve 34 and the normally closed contact 78, respectively. The relay 140 can be of the same type as the relay 40. That is, the relay 140 can be the type of relay wherein a magnetic field produced by the coil 190 causes the contacts 192, 194 of the relay 140 to open and remain open so long as the magnetic field is present. Other components of the dishwasher 120 are the same as shown in FIG. 3.

In operation, the contacts 192, 194 of the relay 140 normally remain closed, thereby applying power to the switches 53, 55. The cams 52, 54 operate to open and close the switches 53, 55, respectively, to thereby selectively apply power to the water heater 24 and the water pump 26, respectively.

When power is applied to open the valve 34, it is possible for a malfunction to occur such that no water passes through the venturi 32, as already described. More particularly, when the timer 142 applies voltage to the valve 34 the timer 142 also applies voltage to the input 197 of the AND gate 195, i.e., the input 197 of the AND gate 195 is "high".

If no water flows through the venturi 32, then voltage from the voltage source 56 is applied to the normally closed contact 78 through the switch arm 74, as described in more detail with regard to the previous embodiment. The normally closed contact 78 is electrically connected to the input 199 of the AND gate 195. Thus, if no water flows through the venturi 32, then voltage is applied to the input 199 of the AND gate 195, i.e., the input 199 of the AND gate 195 is "high".

If voltage is applied to the valve 34 (the input 197 is high) and yet no water flows through the venturi 32 (the input 199 is high), then the output 193 of the AND gate 195 is high, and voltage is applied across the coil 190. The magnetic field resulting from current flow through the coil 190 causes the contacts 192,194 to remain open so long as voltage is applied to the valve 34 and no water flows through the venturi 32. Thus, the dishwasher 120 prevents the heater 24 and the pump 26 from operating without the cooling effect of water and thereby overheating.

The AND gate 195 is schematically depicted herein for ease of explanation and illustration. However, it is to be understood that the AND gate 195 can be embodied by discrete circuitry, as is known by one skilled in the art. For instance, the AND gate may be formed of such discrete circuitry in order to source an adequate amount of current to drive the relay 140. Other details of the dishwasher 120 are substantially similar to the dishwasher 20, and thus are not discussed in detail herein.

In yet another embodiment (FIG. 9), a dishwasher 220 includes an electrical controller 242, which may be in the form of a microprocessor. An output 297 of the controller 242 drives the valve 34. The normally closed contact 78 is electrically connected to an input 299 of the controller 242.

In operation, the controller 242 is powered by voltage received on input 256 from the voltage source 56. The controller 242 applies a voltage to the output 297 and, consequently, to the valve 34 at a predetermined time after the dishwasher 220 has been started by a user. Then, if water flows through the venturi 32, the controller 242 applies voltage to the heater 24 and the pump 26 with timing substantially similar to the timing depicted in FIG. 7a. However, if no water, or an insufficient amount of water, flows through the venturi 32, then a voltage is applied to the input 299 of the controller 242 via the switch arm 74 and the normally closed contact 78.

If the controller 242 receives a voltage on the input 299 while a voltage is being applied to the output 297, then the controller 242 applies no voltage to the outputs 253, 255 to the heater 24 and the pump 26, respectively. That is, the controller 242 prevents voltage from being applied to either the heater 24 or the pump 26 if, while power is applied to the valve 34, no water flows though the venturi 32. The presence of voltage on input 299 indicates to the controller 242 that the switch arm 74 is in contact with the normally closed contact 78, and therefore no water is flowing through the venturi 32. Conversely, the presence of voltage on input 280 through the switch arm 74 and the normally open contact 80 indicates to the controller 242 that water is flowing through the venturi 32 and that power can be applied to the heater 24 and the pump 26.

In general, the controller 242 does not allow any voltage to be applied to either the heater 24 or the pump 26 so long as no water flows through the venturi 32, as indicated by a voltage on the input 299. Thus, the controller 242 prevents the heater 24 and the pump 26 from operating without the cooling effect of water and thereby overheating. Other details of the dishwasher 220 are substantially similar to the dishwasher 20, and thus are not discussed in detail herein. Preferably, the controller 242 is microcomputer-based or microprocessor-based.

In another embodiment (not shown), there is a switch between the voltage source 56 and the switch arm 74. If, after a voltage has been applied to open the valve 34, there is a signal at the input 299 indicating no flow in the venturi 32, then the controller 242 opens the switch to thereby cut all power from the voltage source 56 to the switch arm 74.

Figure 10:
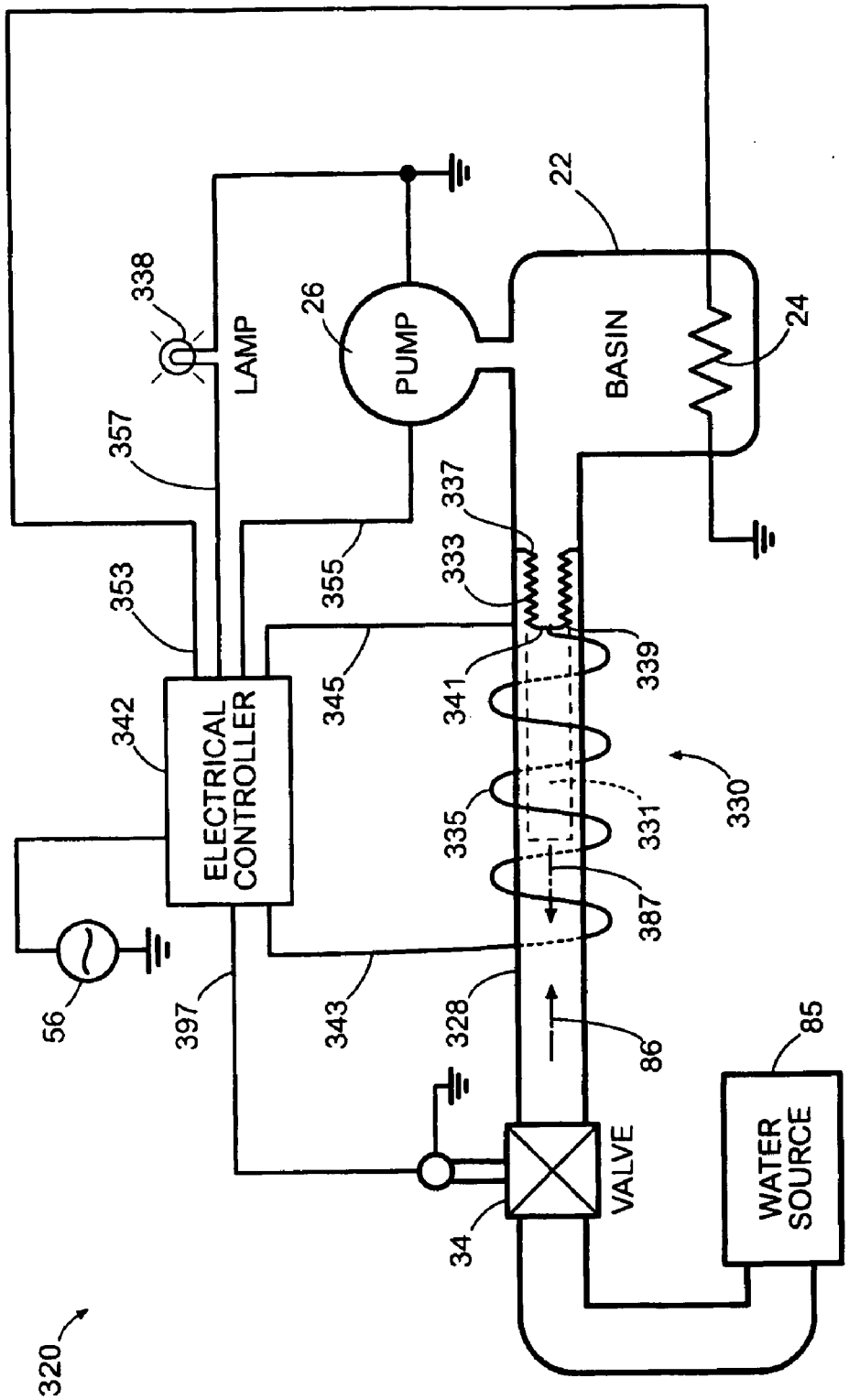
FIG. 10 is a schematic view of another embodiment of a dishwasher of the present invention.

In a further embodiment (FIG. 10), a dishwasher 320 includes a valve 34, a water source 85, an inlet tube 328, an electrical controller 342, a flow sensor assembly 330, an indicator lamp 338, a pump 26, a basin 22 and a heater 24. The electrical controller 342 is microcomputer-based.

Figure 11:
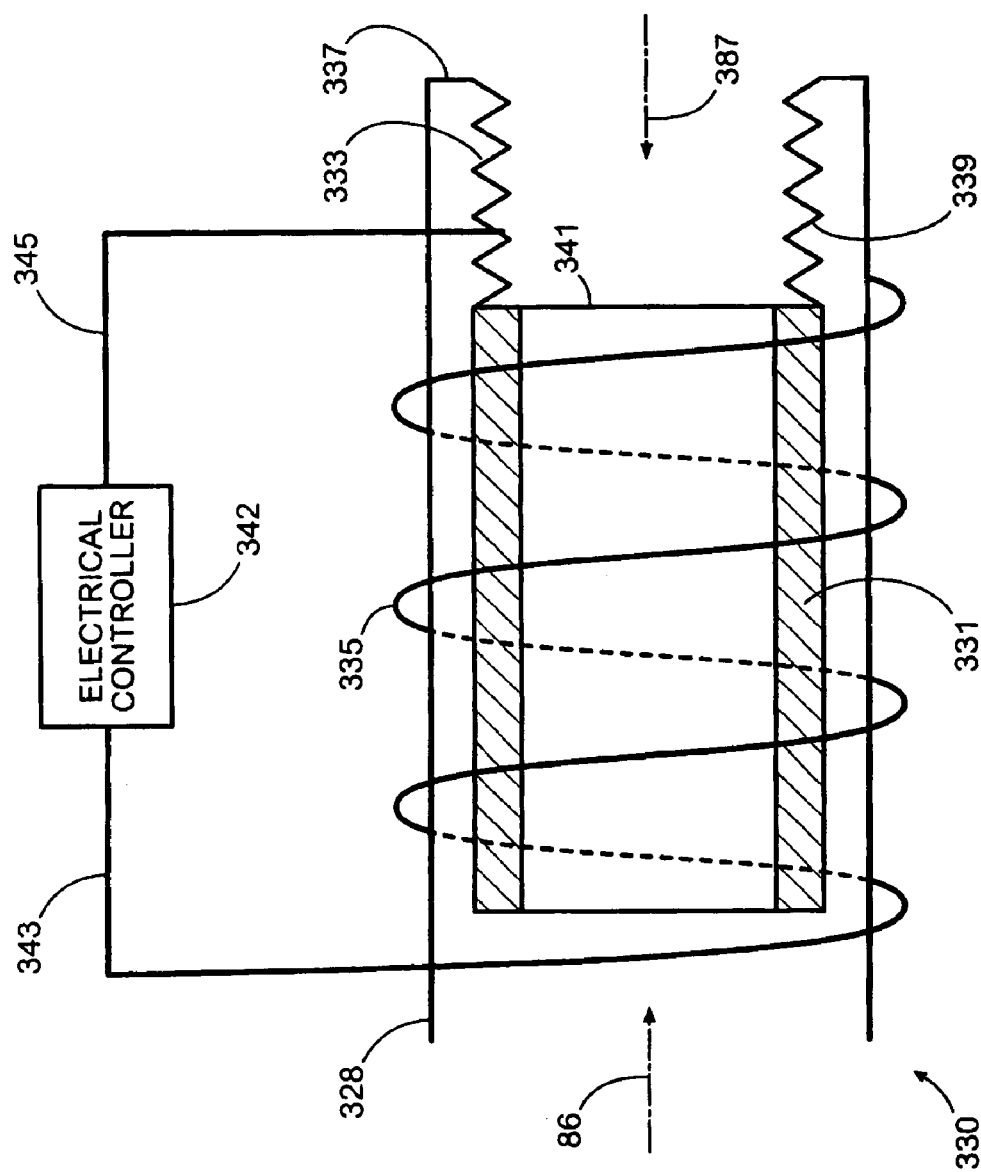
FIG. 11 is an enlarged schematic view of the sensor assembly of the dishwasher of FIG. 10.

The flow sensor assembly 330 in this embodiment includes a flow element in the form of a permanent magnet 331, a biasing device in the form of a spring 333, and a sensing device in the form of a coil 335. Both the magnet 331 and the spring 333 are disposed within the tube 328. As shown in FIG. 11, the magnet 331 can be in the form of a hollow sleeve for allowing the water to flow therethrough in direction 86. The coil 335 is disposed outside of the tube 328 and forms a plurality of wire turns around the tube 328 in the area of the magnet 331. Further, the coil 335 can substantially surround the magnet 331 such that the magnet 331 is disposed within the turns of the coil 335. In an alternative embodiment, the coil can be offset to one end of the sleeve so that the sleeve can move to a position in which it is clear of the coil.

The spring 333 has a downstream end 337 attached to the inside wall of the tube 328. An upstream end 339 of the spring 333 can be attached to or bear against a downstream end 341 of the magnet 331. The magnet 331 is not directly attached to the tube 328 so that the magnet 331 is free to translate within the tube 328 in response to water flow. The magnet 331 has a surface area facing the incoming water flow that is calibrated to achieve a predetermined pushing force on the magnet 331 at an expected input flow rate. The two opposite ends 343 and 345 of the coil 335 can be electrically connected to the controller 342 or to a current sensor or circuit.

During operation, the controller 342 applies a voltage to the valve 34 on output 397 to thereby open the valve 34 and allow water from the water source 85 to enter the tube 328. As the water flows in direction 86, the magnet 331 is pushed in direction 86 against the bias of the spring 333, thereby compressing the spring 333. As the magnet 331 moves in direction 86, the magnet 331 disturbs the electrical current to be carried in the coil 335, as is well known to those skilled in the art. Thus, the magnet 331 and the coil 335 can operate as an inductive transducer or sensor. The current in the coil 335 functions as a control signal. The electrical controller 342 (or current sensor circuit) evaluates the current in the coil 335 to ultimately determine the position of the magnet 331 relative to the coil 335.

When the water flow through the tube 328 stops, the spring 333 pushes the magnet 331 in direction 387, opposite to direction 86. The movement of the magnet 331 again disturbs the electrical current in the coil 335. The electrical controller 342 again evaluates the current in the coil 335.

The controller 342 can determine the time duration or time period of the water flow based upon the status of the current in the coil 335. More particularly, the controller 342 can determine the time duration or time period between the time at which the current in the coil 335 was first disturbed as a result of the magnet 331 moving in direction 86 and the time at which the current in the coil 335 was again disturbed as a result of the magnet 331 moving in direction 387. This time period corresponds to the time period between the point in time at which the magnet 331 started moving in direction 86 as a result of the water flow and the point in time at which the magnet started moving in direction 387 as a result of the cessation of the water flow. That is, the time period determined by the controller 342 corresponds to the time period in which the water flows through the tube 328.

If there are one or more momentary interruptions of the water flow, then the controller 342 can determine or measure two or more time periods of water flow and add the time periods together in order to determine a total amount of time in which water flows through the tube 328. The controller 342 can control the operation of the heater 24 and/or the pump 26 based upon the time period or duration of the water flow. Further, it is also possible, with some modifications, for the controller 342 to determine a total amount or volume of water that has flowed through the tube 328 based upon the time period or duration of the water flow and knowledge of the water flow rate.

If the controller 342 does not sense a disturbance in the current in the coil 335 after the valve 34 has been opened, then the controller 342 inhibits operation of the dishwasher 320. More particularly, if the controller 342 does not sense a disturbance in the current in coil 335 after the valve 34 has been opened, then the controller 342 does not supply a voltage to either the water heater 24 or the water pump 26. That is, no voltage is provided on outputs 353, 355. Rather, the controller 342 provides a voltage on output 357 in order to power on a fault indicator lamp 338. The lamp 338 indicates to the user that there is no water flowing through the tube 328 even though power has been applied to the valve 34, and hence, there may be a leak that requires repair.

As discussed above, it is possible for the controller 342 to prevent the application of voltage to the heater 24 and/or the pump 26 if the measured time duration of the water flow through the tube 328 is below a predetermined threshold. That is, power can be withheld from the heater 24 and/or the pump 26 if the time period between the magnet 331 moving in direction 86 and then moving back in direction 387 is inadequate to provide a large enough volume of water for the required cooling effect for the dishwasher elements 24, 26. The controller 342 can also terminate a dishwasher cycle if the measured time duration of the water flow through the tube 328 is below the predetermined threshold. Further, the controller 342 can power on the fault indicator light 338 to indicate to a user that the amount of water that has flowed through the inlet tube 328, as calculated or estimated based upon the measured time duration of the water flow through the tube 328, is insufficient for proper dishwasher operation.

Figure 9:
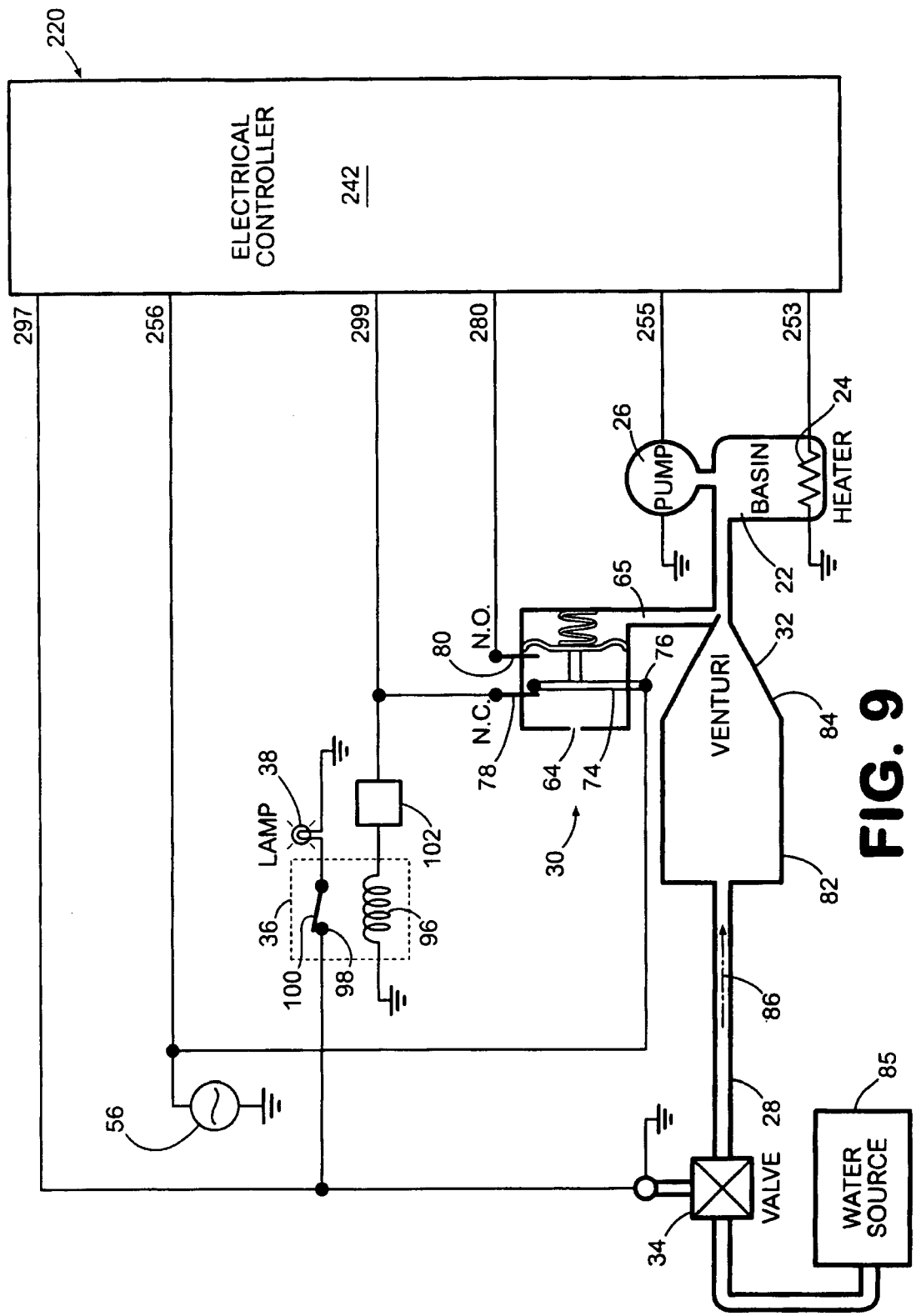
FIG. 9 is a schematic view of yet another embodiment of a dishwasher of the present invention.

Similarly, it is also possible for the controller 242 of FIG. 9 to prevent the application of voltage to the heater 24 and/or the pump 26 if the measured time duration of the water flow through the tube 28 is below a predetermined threshold. Such a measured time duration would correspond to the time period in which a voltage is present at the input 280 of the controller 242. Further, any embodiment disclosed herein that includes the use of a microcomputer-based controller is capable of preventing the application of voltage to the heater 24 and/or the pump 26 based upon the measured time duration of the water flow through the tube.

In a further embodiment (FIG. 12), a sensor assembly 430 includes a flow element in the form of a permanent magnet 431, a biasing device in the form of a spring 433, and a sensing device in the form of a proximity switch 474. In the particular embodiment shown in FIG. 12, the proximity switch 474 is in the form of a reed switch having contacts 475, 477 sealed in a tube 479. The reed switch 474 is disposed outside of the tube 428 and is attached to the outside surface of the tube 428 downstream of the magnet 431 and the spring 433. The sensor assembly 430 can be used in place of the sensor assembly 330 in the dishwasher of FIG. 10.

Figure 12:
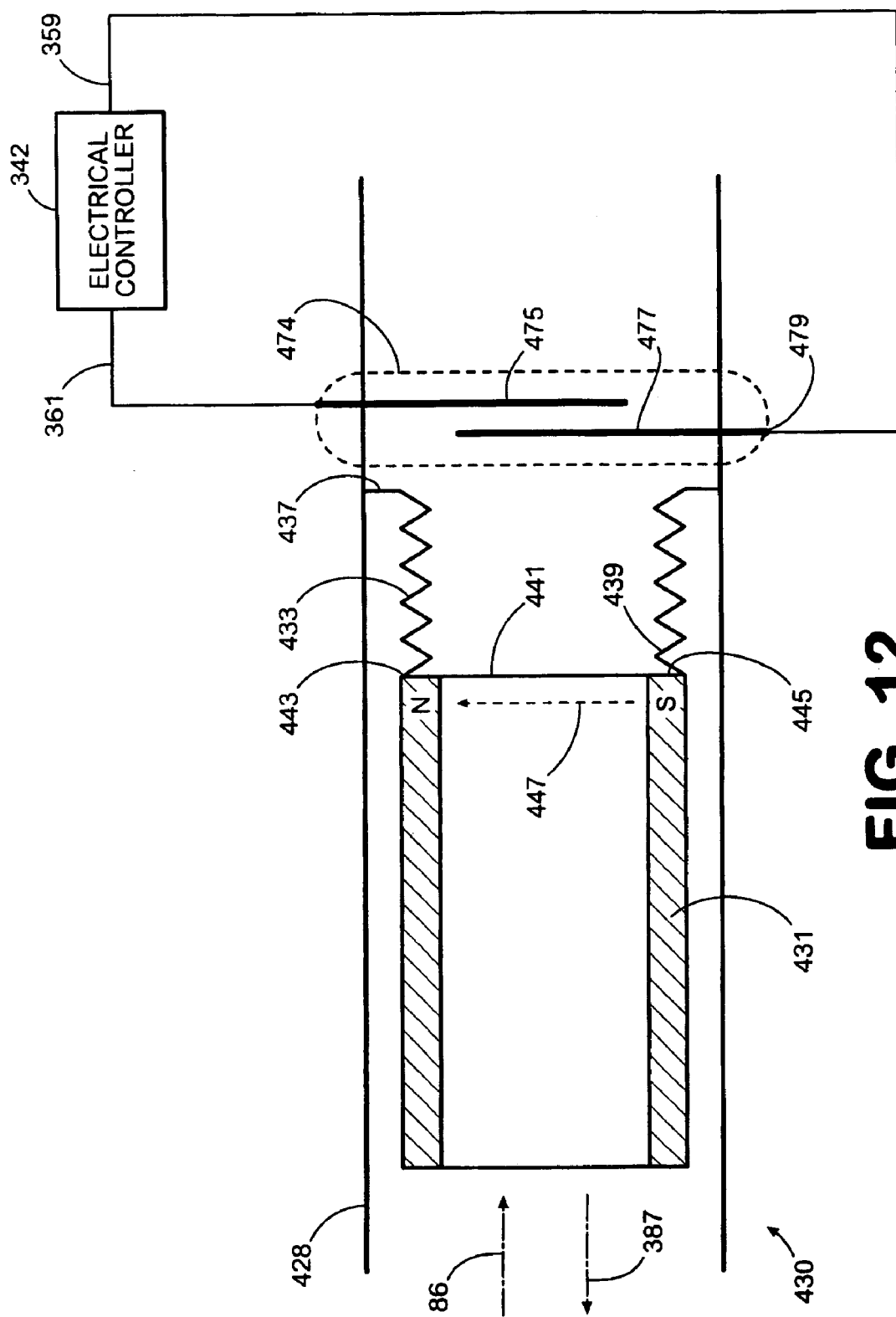
FIG. 12 is an enlarged schematic view of another embodiment of a sensor assembly of the present invention.

Both the magnet 431 and the spring 433 are disposed within the tube 428. As shown in FIG. 12, the magnet 431 is in the form of a hollow sleeve having two opposite open ends for allowing the water to flow therethrough in direction 86. A downstream end 441 of the magnet 431 has two oppositely polarized sections 443, 445. A magnetic line of force 447 represents the direction of the magnetic flux between the sections 443, 445.

The spring 433 has a downstream end 437 attached to the inside wall of the tube 428. An upstream end 439 of the spring 433 is attached to the downstream end 441 of the magnet 431. The magnet 431 is not directly attached to the tube 428.

Figure 13:
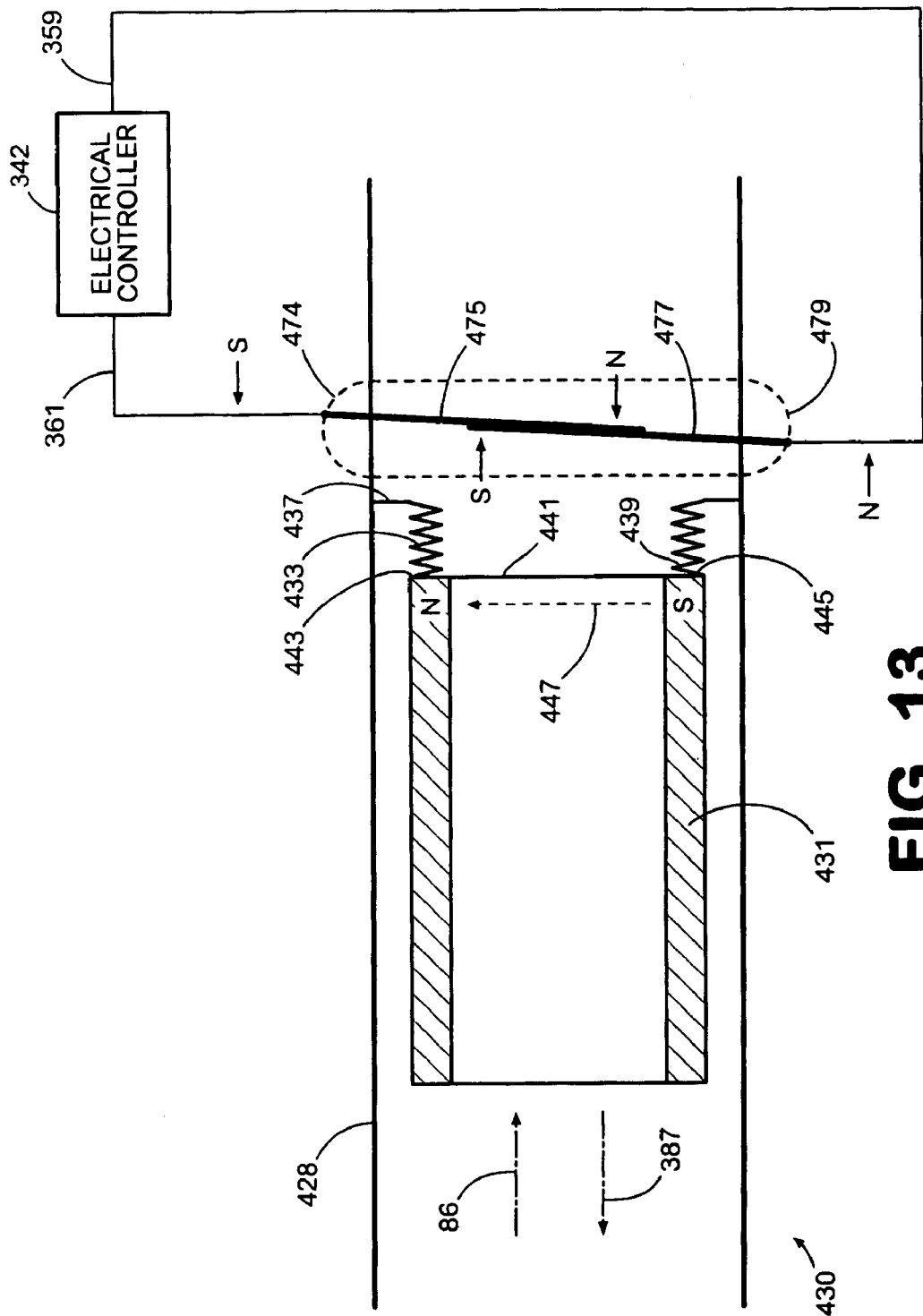
FIG. 13 is an enlarged schematic view of the sensor assembly of FIG. 12 when water is flowing through the tube.

During operation, the controller 342 applies a voltage to the valve 34 to thereby allow water to enter the tube 428. As the water flows in direction 86, the magnet 431 is pushed in direction 86 against the bias of the spring 433, thereby compressing the spring 433. As the magnet 431 moves in direction 86 to the position shown in FIG. 13, the contacts 475, 477 become magnetized due to the proximity of the polarized section 443, 445 of the magnet 431, as is well known to those skilled in the art. As a result of the magnetization of the contacts 475, 477, the contacts 475, 477 attract each other and become electrically connected to each other.

The controller 342 senses the electrical connection between the contacts 475, 477. More particularly, the controller 342 can apply a small voltage to its output 359. If the voltage signal from output 359 is transmitted through the contacts 475, 477 of the switch 474 to the input 361 of the controller, then the controller 342 determines that the magnet 431 is in the position of FIG. 13 and that water is flowing through the tube 428. Thus, the voltage transmitted through the contacts 475, 477 and to the input 361 functions as a control signal.

When the water flow through the tube 428 stops, the spring 433 pushes the magnet 431 in direction 387, opposite to direction 86. The movement of the magnet 431 back to the position of FIG. 12 results in the demagnetization of the contacts 475, 477. The contacts 475, 477 are no longer attracted to each other and physically separate such that there is no longer an electrical connection therebetween. The electrical controller 342 senses the separation of the contacts 475, 477 by the loss or disappearance of the voltage on input 361.

The controller 342 can determine the time duration or time period of the water flow based upon the status of the reed switch 474. More particularly, the controller 342 can determine the time duration or time period between the time at which the contacts 475, 477 are electrically connected and the time at which the contacts 475, 477 become separated.

This time period corresponds to the time period between the point in time at which the magnet 431 is pushed in direction 86 by the water flow and the point in time at which the magnet 431 is pushed in direction 387 at the cessation of the water flow. That is, the time period determined by the controller 342 corresponds to the time period in which the water flows through the tube 428.

The controller 342 can inhibit operation of the dishwasher elements 24, 26 if the time duration of the water flow through the tube 428 is insufficient to enable safe operation of the dishwasher elements 24, 26. Of course, the controller 342 can also inhibit operation of the dishwasher elements 24, 26 if there is no water flow through the tube 428. More particularly, if the controller 342 does not sense an electrical connection between the contacts 475, 477 after the valve 34 has been opened, then the controller 342 inhibits operation of the dishwasher. Still more particularly, if the controller 342 does not sense a voltage at input 361 after the valve 34 has been opened, then the controller 342 does not supply a voltage to either the water heater 24 or the water pump 26.

Figure 14:
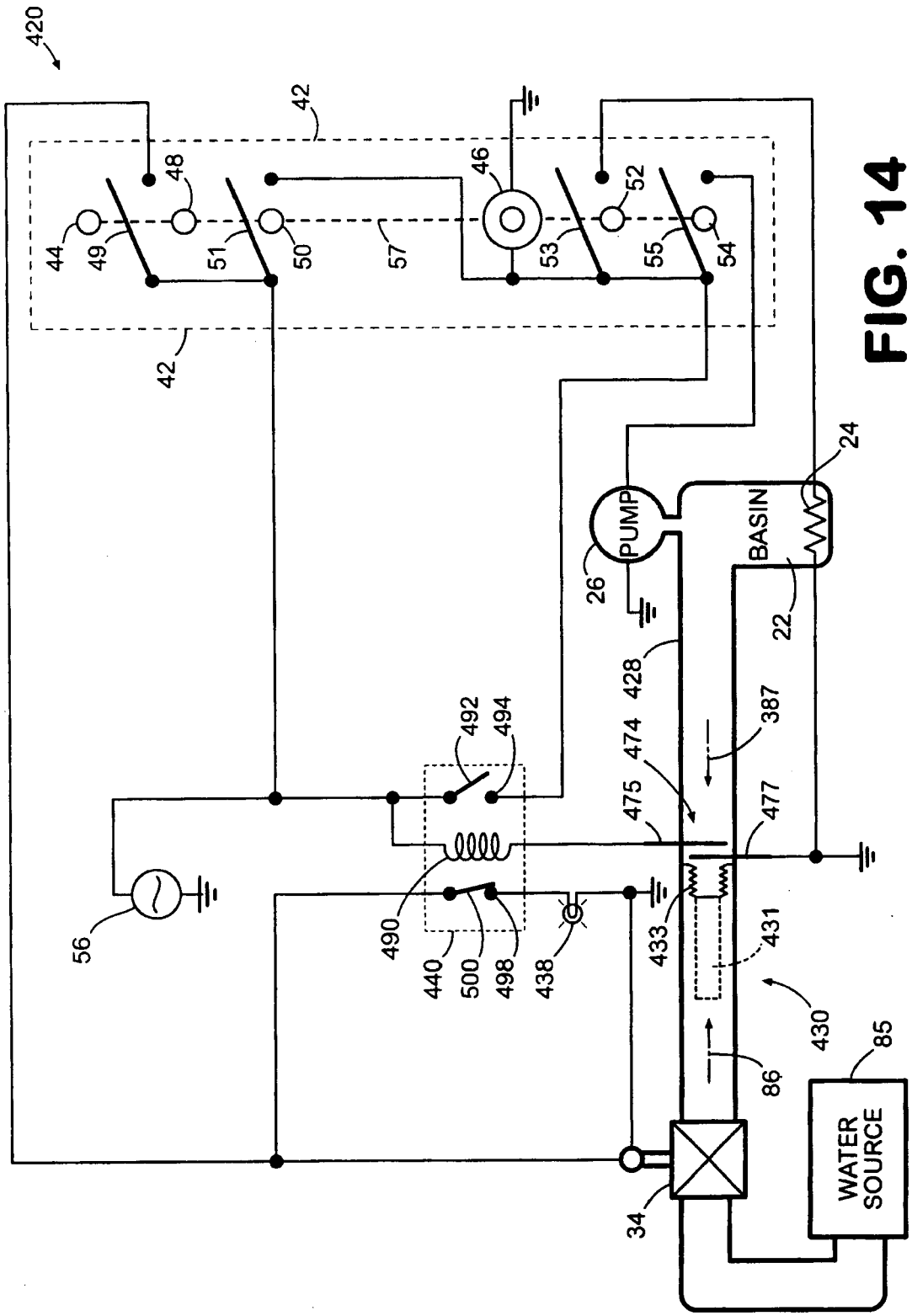
FIG. 14 is a schematic view of yet another embodiment of a dishwasher of the present invention, including the sensor assembly of FIG. 12.

In a still further embodiment of the invention, a dishwasher 420 shown in FIG. 14 includes the flow sensor assembly 430, a relay 440 and the timer module 42. The relay 440 includes a pair of normally closed contacts 498, 500, and a pair of normally open contacts 492, 494.

During operation, manual actuation of the control knob 44 by the user causes the switch 51 to close, thereby applying voltage from the voltage source 56 to the timer motor 46. The timer motor 46 causes the cam shaft 57 and the cam 48 to rotate, thereby closing the switch 49 and applying voltage to the valve 34. As the valve 34 opens, water flows from the water source 85 and through the tube 328 in direction 86. The water pushes the magnet 431 in direction 86 against the bias of the spring 433, thereby causing the contacts 475, 477 of the reed switch 474 to close, as discussed above. After the contacts 475, 477 close, electrical current flows from the voltage source 56, through the coil 490, and through the reed switch 474 to ground. The excitation of the coil 490 causes the contacts 498, 500 to open, thereby preventing the fault indicator lamp 438 from being powered on.

The excitation of the coil 490 also causes the contacts 492, 494 to close, thereby connecting the voltage source 56 to the timer motor 46. This current path from the voltage source 56 to the timer motor 46 through the contacts 492, 494 is in parallel with the current path from the voltage source 56 to the timer motor 46 through the switch 51. As the timer motor 46 continues to operate, the rotation of the cam 50 causes the switch 51 to open, and then the only source of power to the timer motor 46 is through the contacts 492, 494. Further operation of the timer motor 46 causes the switches 53, 55 to close, thereby connecting the voltage source 56 to the heater 24 and the pump 26, respectively.

After operation of the heater 24 and pump 26, all four of the switches 49, 51, 53 and 55 change their state substantially simultaneously. More particularly, the switches 53, 55 open to remove power from the heater 24 and the pump 26, respectively; the switch 51 closes to provide an alternate power path to the timer motor 46; and the switch 49 opens to remove power from the valve 34. As the valve 34 closes and the water flow through the tube 428 stops, the magnet 431 moves away from the reed switch 474 in direction 387. With the magnet 431 farther away, the demagnetized contacts 475, 477 of the reed switch 474 open, causing the contacts 498, 500 to close and the contacts 492, 494 to open.

If water does not flow through the tube 428 when voltage is applied to the valve 34, then the magnet 431 does not move in direction 86 and the contacts 475, 477 of the reed switch 474 do not close. Further, no current runs through the coil 490 and the contacts 498, 500 remain closed, thereby causing the fault indicator light 438 to be powered on. The illuminated fault indicator light 438 visually indicates to the user that there may be a leak or malfunction of the valve 34 that requires repair.

Another consequence of no current running through the coil 490 is that the contacts 492, 494 remain open. The rotation of the cam 50 causes the switch 51 to open, thereby removing all power from the timer motor 46 and preventing any further rotations of cams 48, 50, 52, 54. The opening of the switch 51 and the removal of power from the timer motor 46 stops the operation of the cams 52, 54 and prevents the cams 52, 54 from causing the switches 53, 55 to close. Thus, with the switches 53, 55 remaining open, no power is applied to either the water heater 24 or the water pump 26. As described above, the flow sensor assembly 430 is used to prevent the application of voltage to the heater 24 and the pump 26 if no water on which these dishwasher elements 24, 26 can operate is available in the tube 428.

In another embodiment (FIG. 15), a dishwasher 520 includes a temperature-sensing device in the form of a thermistor 530. An electrical controller 542 is electrically connected across the thermistor 530. The thermistor 530 has a resistance that changes with temperature according to a known relationship. The thermistor 530 is disposed in a water inlet conduit or tube 528. A water source 85, such as a municipal water supply, a well, a water heater, or some combination thereof, is fluidly connected to the water inlet tube 528.

In operation, the thermistor 530 detects a change in temperature and/or a flow of water within the water inlet tube 528. More particularly, the electrical controller 542 places an electrical voltage across the thermistor 530 and measures and monitors the resulting current flowing through the thermistor 530. Because the voltage across the thermistor 530 and the current through the thermistor 530 are known, the controller 542 can also measure and monitor the resistance of the thermistor 530 according to Ohm's Law. The current flowing through the thermistor 530 has the effect of heating the thermistor 530 and thereby changing the resistance of the thermistor 530. For instance, the resistance of the thermistor 530 may rise with temperature.

The controller 542 uses the thermistor 530 to detect whether there is a flow of water through the tube 528 after the controller 542 opens the valve 34. Before the valve 34 is opened, unless the dishwasher 520 has been used recently, the temperature within the tube 528 is likely to be around room temperature. After the valve 34 is opened and water flows through the tube 528, the temperature within the tube 528 is likely to differ from room temperature. Moreover, a flow of water across the thermistor 530 is effective in carrying heat away from the heated thermistor 530, thereby reducing the temperature of the thermistor 530.

The controller 542 applies a voltage to the valve 34 in order to allow water to enter the tube 528. Next, the controller 542 monitors the current flowing through the thermistor 530, which is indicative of the resistance and temperature of the thermistor 530 according to a known relationship. If, as expected, the measured current of the thermistor 530 changes by more than a threshold amount, which is indicative of the temperature of the thermistor 530 changing by more than a threshold amount, then the controller 542 determines that there is water flowing through the tube 528.

More particularly, the controller 542 can calculate a difference between a thermistor temperature measured before the opening of the valve 34 and a thermistor temperature measured after the opening of the valve 34. The controller 542 can determine whether the temperature difference equals or exceeds a predetermined threshold that is indicative of water flow. If the temperature difference threshold is exceeded, the controller 542 can then apply voltage to the heater 24 and the pump 26 since it is known that these dishwasher elements 24, 26 have water available on which to operate.

Conversely, if the measured temperature of the thermistor 530 does not change after voltage has been applied to the valve 34, then the controller 542 determines that there is no water, or an insufficient amount of water, flowing through the tube 528. The controller 542 can then apply voltage to the fault indicator light 538 in order to indicate to the user that there may be a leak or a malfunctioning valve in need of repair. In this case, the controller 542 would inhibit operation of at least a portion of the dishwasher 520. More particularly, the controller 542 would prevent the application of power to the heater 24 and the pump 26 in order to prevent these dishwasher elements 24, 26 from overheating in the absence of the cooling effect of water. However, even though the operation of the heater 24 and/or the pump 26 is inhibited, the controller 542 could continue operation of other components of the dishwasher 520, such as the fault indicator light 538, for example.

Figure 15:
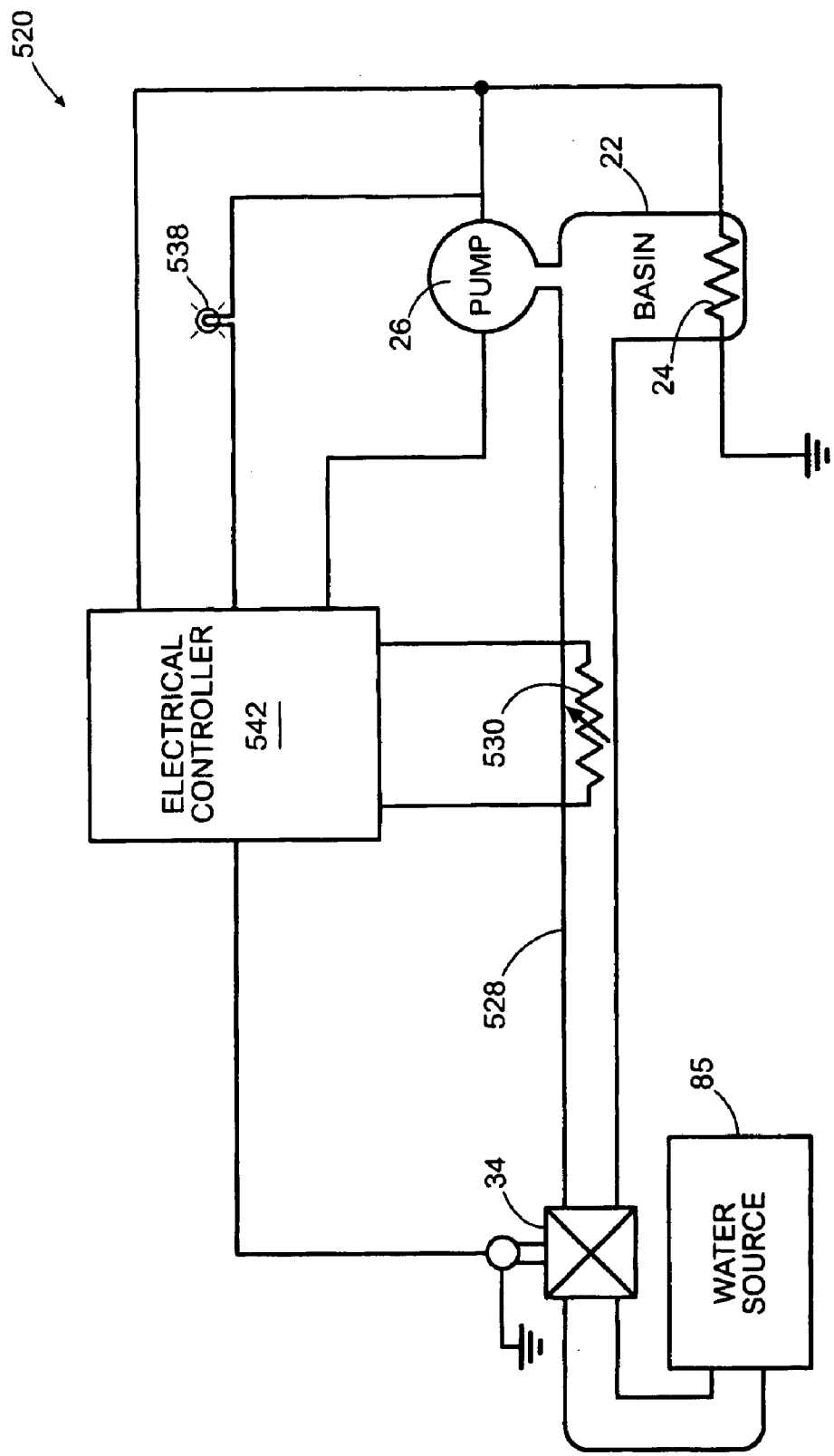
FIG. 15 is a schematic view of a further embodiment of a dishwasher of the present invention.

The embodiment of FIG. 15 has been described herein as using the flow of water through the tube 528 to carry heat away from the thermistor 530. It is to be understood, however, that it is also possible to cause heated water from a water heater to flow through the tube 528 and add heat to the thermistor 530. In this case, the voltage applied across the thermistor 530 would have to be low enough that the temperature of the thermistor 530 before the opening of the valve 34 is below the temperature of the water that is to flow through the tube 528. The controller 542 would detect the flow of water by sensing a temperature rise in the thermistor 530.

As described herein, the present invention advantageously increases the functionality of an appliance. While this invention has been described as having a preferred design, the present invention can be further modified within the spirit and scope of this disclosure. This application is therefore intended to cover any variations, uses, or adaptations of the invention using its general principles. This application is intended to cover such departures from the present disclosure as come within known or customary practice in the art to which this invention pertains and which fall within the limits of the appended claims.

What is claimed is:

1. A dishwasher, comprising:
    a water inlet within a dishwasher that is connectable to a water source;
    a dishwasher element within the dishwasher that is operable on water received through said inlet;
    a flow sensor in fluid communication with said inlet and operable to generate a control signal indicative of water flow through said inlet, the flow sensor including a vacuum switch; and
    a control apparatus connected between said dishwasher element and said flow sensor and operable to inhibit operation of said dishwasher element in response to said control signal.

2. The dishwasher of claim 1, wherein said flow sensor includes a conduit and a venturi opening in communication between said conduit and said vacuum switch.

3. The dishwasher of claim 1, wherein the control apparatus includes a cycle controller configured to initiate timed operation of said dishwasher element, said control apparatus being configured to remove power from the cycle controller if the water is not flowing through the flow sensor.

4. The dishwasher of claim 3, further comprising a valve in fluid communication with and disposed upstream from the flow sensor, the cycle controller being configured to cause the valve to open to thereby allow water into the flow sensor.

5. The washer of claim 3, wherein said cycle controller is digital and configured to bypass the application of power to the dishwasher element in response to the control signal.

6. The dishwasher of claim 1, wherein the control apparatus includes a cycle controller having a timer module configured to initiate timed operation of said dishwasher element, said control apparatus being configured to remove power from the timer module if the water is not flowing through the flow sensor.

7. The dishwasher of claim 6, wherein the timer module includes a switch configured to selectively apply power to said dishwasher element, said control apparatus including a relay configured to electrically connect said switch to a voltage source dependent upon said control signal.

8. The dishwasher of claim 1, wherein said control apparatus is configured to remove power from the dishwasher element in response to said control signal.

9. The dishwasher of claim 1, further comprising a fault light connected to said flow sensor to illuminate in response to said control signal indicating that water is not flowing through the flow sensor.

10. The dishwasher of claim 1, wherein said flow sensor is disposed downstream of said inlet.

11. An apparatus for operating a dishwasher, comprising:
    a vacuum switch for sensing a flow of water through a conduit in a dishwasher and generating a signal indicative of water flowing in the conduit; and
    a control apparatus for inhibiting an operation of the dishwasher in response to the signal from the vacuum switch.

12. The apparatus of claim 11 further comprising:
    a venturi coupled between the conduit and the vacuum switch, the venturi responding to water flow in the conduit.

13. The apparatus of claim 12 further comprising;
    a timer module coupled to the control apparatus and the control apparatus being configured to remove power from the timer module in response to the signal generated by the vacuum switch.

14. The apparatus of claim 13 further comprising:
    a fault indicator coupled to the flow sensor so that the fault indicator illuminates in response to the signal from the vacuum switch indicating no water is flowing in the conduit.

15. A method for controlling dishwasher operation comprising:
    detecting water flow in a conduit of a dishwasher;
    generating with a vacuum switch a control signal indicative of the detected water flow;
    inhibiting operation of a dishwasher element in response to the control signal.

16. The method of claim 15, the water flow detection further comprising:
    detecting a differential pressure in a venturi coupled to the conduit.

17. The method of claim 16 further comprising:
    illuminating a fault detector in response to the control signal.

18. The method of claim 17 further comprising:
    removing power from a timer module in response to the control signal.

* * * * *